(12) United States Patent
Okamoto et al.

(10) Patent No.: US 11,951,686 B2
(45) Date of Patent: Apr. 9, 2024

(54) METHOD FOR MANUFACTURING THREE-DIMENSIONAL SHAPED OBJECT AND THREE-DIMENSIONAL SHAPING APPARATUS

(71) Applicant: SEIKO EPSON CORPORATION, Tokyo (JP)

(72) Inventors: Eiji Okamoto, Matsumoto (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,168

(22) Filed: Feb. 23, 2022

(65) Prior Publication Data

US 2022/0274337 A1 Sep. 1, 2022

(30) Foreign Application Priority Data

Feb. 26, 2021 (JP) .................. 2021-029759

(51) Int. Cl.
*B29C 64/314* (2017.01)
*B29C 64/106* (2017.01)
*B29C 64/209* (2017.01)
*B29C 64/295* (2017.01)
*B29C 64/321* (2017.01)
*B33Y 30/00* (2015.01)
*B33Y 40/10* (2020.01)
(Continued)

(52) U.S. Cl.
CPC .......... *B29C 64/314* (2017.08); *B29C 64/209* (2017.08); *B29C 64/295* (2017.08); *B29C 64/321* (2017.08); *B33Y 30/00* (2014.12); *B33Y 40/10* (2020.01); *B33Y 70/00* (2014.12); *B29C 64/106* (2017.08); *B29C 2793/0027* (2013.01); *B29K 2101/12* (2013.01)

(58) Field of Classification Search
CPC .................................................... B29C 45/464
See application file for complete search history.

(56) References Cited

U.S. PATENT DOCUMENTS 6,431,847 B1 * 8/2002 Hawley .................. B29C 48/40
118/420
2017/0210074 A1 7/2017 Ueda et al.
2017/0297053 A1 * 10/2017 Tyler .................. B29C 48/2886
(Continued)

FOREIGN PATENT DOCUMENTS

JP 2019-098569 A 6/2019
JP 2021-000754 A 1/2021
WO WO2015/182675 A 12/2015

*Primary Examiner* — Timothy Kennedy
*Assistant Examiner* — Ariella Machness
(74) *Attorney, Agent, or Firm* — WORKMAN NYDEGGER

(57) ABSTRACT

A method for manufacturing a three-dimensional shaped object includes: a plasticizing step of plasticizing at least a part of a shaping material containing a thermoplastic resin to generate a plasticized material; a fiber introducing step including at least one of a step of introducing a covered fiber material, which is a fiber material covered with a covering material, into the plasticized material after being discharged from the nozzle opening, and a step of introducing the covered fiber material into the shaping material or the plasticized material before being discharged from the nozzle opening; and a shaping step of shaping a three-dimensional shaped object including the covered fiber material.

16 Claims, 17 Drawing Sheets

(51) Int. Cl.
 *B33Y 70/00* (2020.01)
 *B29K 101/12* (2006.01)

(56) References Cited

U.S. PATENT DOCUMENTS

| | | | |
|---|---|---|---|
| 2019/0030820 A1* | 1/2019 | Saito | B33Y 50/02 |
| 2019/0084252 A1* | 3/2019 | Hochstetter | B29B 15/122 |
| 2019/0160746 A1* | 5/2019 | Anegawa | B33Y 70/10 |
| 2019/0315055 A1* | 10/2019 | Tyler | B29C 64/118 |
| 2020/0114578 A1* | 4/2020 | Azarov | B29C 48/06 |
| 2020/0230878 A1* | 7/2020 | Azarov | B29C 64/165 |
| 2020/0398469 A1 | 12/2020 | Yuwaki | |

* cited by examiner

METHOD FOR MANUFACTURING THREE-DIMENSIONAL SHAPED OBJECT AND THREE-DIMENSIONAL SHAPING APPARATUS

The present application is based on, and claims priority from JP Application Serial Number 2021-029759, filed Feb. 26, 2021, the disclosure of which is hereby incorporated by reference herein in its entirety.

BACKGROUND

1. Technical Field

The present disclosure relates to a method for manufacturing a three-dimensional shaped object and a three-dimensional shaping apparatus.

2. Related Art

Various manufacturing methods are known for shaping a three-dimensional shaped object by ejecting a plasticized material, which is generated by plasticizing a thermoplastic resin, onto a stage from a nozzle. For example, the following WO15/182675 discloses a technique of shaping a three-dimensional shaped object including a fiber material inside by introducing the fiber material such as a carbon fiber into a thermoplastic resin such as a filament that is heated and softened and ejecting the fiber material from a nozzle. According to the technique of WO15/182675, strength of the three-dimensional shaped object can be increased by introducing the fiber material into the inside of the three-dimensional shaped object.

In the technique of WO15/182675, when the three-dimensional shaped object is shaped by introducing the fiber material into a plasticized material that is generated by plasticizing the thermoplastic resin, the plasticized material may not be compatible with a surface of the fiber material, and air bubbles may be mixed into the plasticized material. Such inclusion of air bubbles may cause a decrease in strength of the three-dimensional shaped object to be shaped.

SUMMARY

The present disclosure is intended to solve the above-described problem, and can be realized as the following application examples.

A method for manufacturing a three-dimensional shaped object according to an application example of the present disclosure includes: a plasticizing step of plasticizing at least a part of a shaping material containing a thermoplastic resin to generate a plasticized material; a fiber introducing step including at least one of a step of introducing a covered fiber material, which is a fiber material covered with a covering material, into the plasticized material after being discharged from the nozzle opening, and a step of introducing the covered fiber material into the shaping material or the plasticized material before being discharged from the nozzle opening; and a shaping step of shaping a three-dimensional shaped object including the covered fiber material.

In a method for manufacturing a three-dimensional shaped object according to another application example of the present disclosure, an absolute value of a difference between an SP value of the thermoplastic resin and an SP value of the covering material is 5.0 or less.

In a method for manufacturing a three-dimensional shaped object according to another application example of the present disclosure, the covering material includes a thermoplastic resin of the same type as the thermoplastic resin contained in the plasticized material.

A method for manufacturing a three-dimensional shaped object according to another application example of the present disclosure includes a covering step of, before the fiber introducing step, generating the covered fiber material by passing the fiber material through a storage portion in which the covering material is stored.

In a method for manufacturing a three-dimensional shaped object according to another application example of the present disclosure, the plasticizing step includes, in a plasticizing apparatus that includes a flat screw that has a groove forming surface in which a groove portion is formed, a facing portion that has a facing surface facing the groove forming surface and that is formed with a communication hole communicating with the nozzle opening, and a heater that is configured to heat the flat screw or the facing portion, a step of guiding at least a part of the thermoplastic resin supplied between the flat screw and the facing portion to the communication hole while plasticizing the thermoplastic resin by rotation of the flat screw and heating of the heater.

In a method for manufacturing a three-dimensional shaped object according to another application example of the present disclosure, the groove forming surface or the facing surface has an introduction groove that is configured to guide the fiber material from a side of the flat screw or the facing portion to the communication hole, and in the fiber introducing step, the covered fiber material is introduced into the shaping material through the introduction groove.

In a method for manufacturing a three-dimensional shaped object according to another application example of the present disclosure, the flat screw has a through hole that is opened in the groove forming surface and that communicates with the communication hole. The fiber introducing step includes a step of introducing the covered fiber material into the plasticized material through the through hole.

In a method for manufacturing a three-dimensional shaped object according to another application example of the present disclosure, the fiber introducing step includes a pressure control step of controlling a pressure in the through hole to be higher than a pressure in the communication hole.

In a method for manufacturing a three-dimensional shaped object according to another application example of the present disclosure, the shaping step includes: a moving step of relatively moving a stage at which the three-dimensional shaped object is supported and a nozzle unit having the nozzle opening, and a fiber introduction control step of changing an introduction speed at which the covered fiber material is introduced into the shaping material or the plasticized material in accordance with a relative movement speed between the nozzle unit and the stage in the moving step.

A method for manufacturing a three-dimensional shaped object according to another application example of the present disclosure includes a cutting step of cutting the fiber material before or after the fiber introducing step.

In a method for manufacturing a three-dimensional shaped object according to another application example of the present disclosure, the cutting step includes a step of cutting the covered fiber material by operating a discharge amount control mechanism that is provided upstream of the nozzle opening and that is configured to control a discharge amount of the plasticized material.

In a method for manufacturing a three-dimensional shaped object according to another application example of the present disclosure, the discharge amount control mechanism is driven by a motor, and the fiber introducing step includes a step of transmitting a driving force generated by the motor to a conveying unit of the covered fiber material to convey the covered fiber material.

A three-dimensional shaping apparatus according to another application example of the present disclosure includes: a plasticizing unit configured to plasticize at least a part of a shaping material containing a thermoplastic resin to generate a plasticized material; a discharging unit having a nozzle opening; a fiber introducing unit having at least one of a function of introducing a covered fiber material, which is a fiber material covered with a covering material, into the plasticized material after being discharged from the nozzle opening, and a function of introducing the covered fiber material into the shaping material or the plasticized material before being discharged from the nozzle opening; and a control unit configured to control the plasticizing unit, the discharging unit, and the fiber introducing unit to shape a three-dimensional shaped object including the covered fiber material.

DESCRIPTION OF EXEMPLARY EMBODIMENTS

Figure 1:
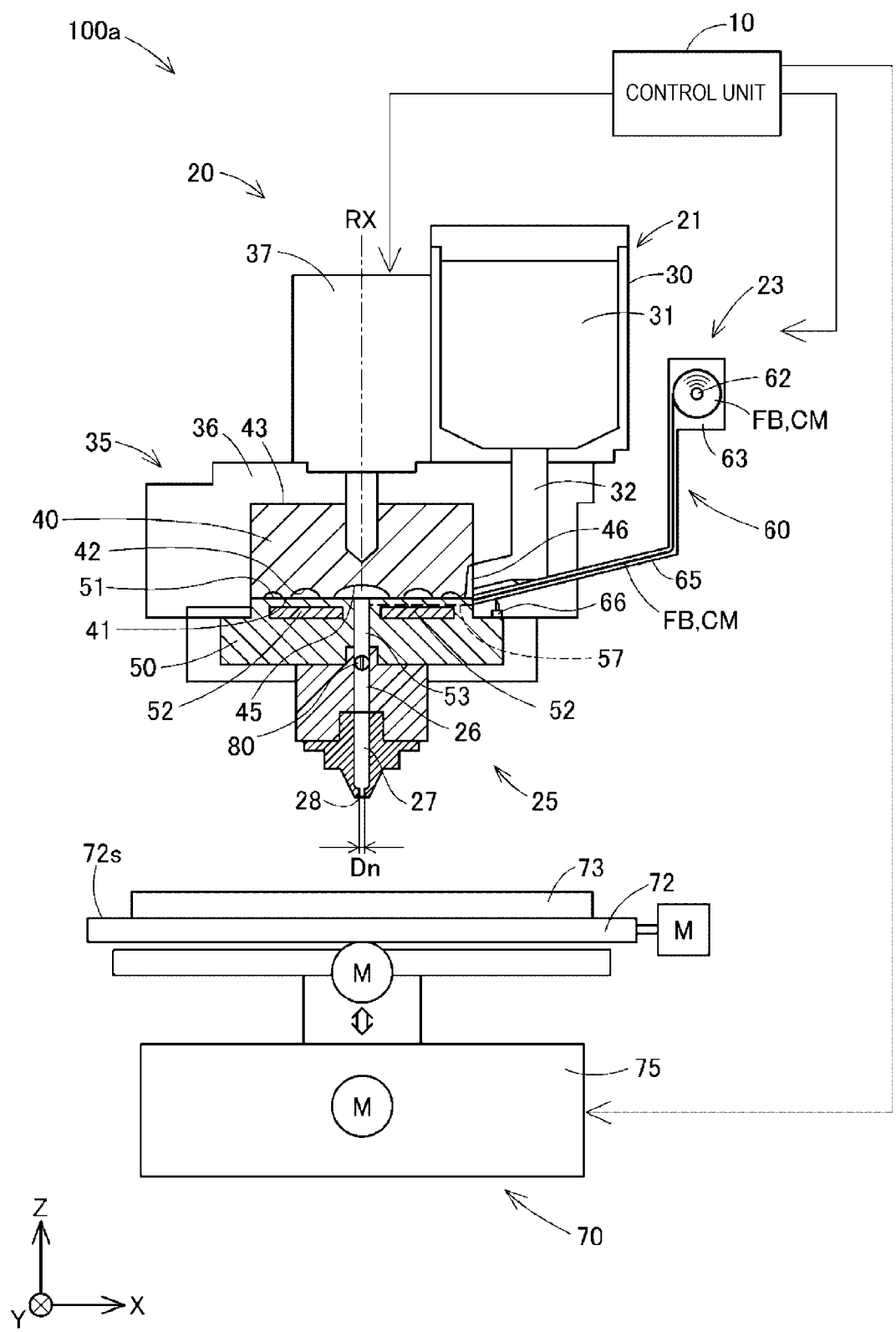
FIG. 1 is a schematic diagram showing a configuration of a three-dimensional shaping apparatus according to a first embodiment.

Hereinafter, a method for manufacturing a three-dimensional shaped object and a three-dimensional shaping apparatus according to the present disclosure will be described in detail based on embodiments shown in the drawings.

1 First Embodiment

FIG. 1 is a schematic diagram showing a configuration of a three-dimensional shaping apparatus 100*a* that executes a method for manufacturing a three-dimensional shaped object according to a first embodiment. FIG. 1 shows arrows indicating X, Y, and Z directions orthogonal to one another. The X direction and the Y direction are directions parallel to a horizontal plane, and the Z direction is a direction opposite to a gravity direction. The arrows indicating the X, Y, and Z directions are also shown in other drawings to be referred as necessary so as to correspond to FIG. 1.

The three-dimensional shaping apparatus 100*a* includes a control unit 10, a discharging unit 20, and a shaping stage unit 70. Under control of the control unit 10, the discharging unit 20 laminates shaping layers formed by discharging a plasticized material to the shaping stage unit 70, so that the three-dimensional shaping apparatus 100*a* shapes a three-dimensional shaped object. Hereinafter, the "three-dimensional shaped object" is also simply referred to as a "shaped object", and the "three-dimensional shaping apparatus" is also referred to as a "shaping apparatus".

The control unit 10 controls an operation of the entire shaping apparatus 100*a* to execute shaping processing of shaping a shaped object. In the first embodiment, the control unit 10 is a computer including one or a plurality of processors (CPUs) and a main storage device (RAM). By the processor executing programs and commands read into the main storage device, the control unit 10 exerts various functions. At least a part of the functions of the control unit 10 may be implemented by a hardware circuit.

The discharging unit 20 includes a material generation unit 21, a fiber introducing unit 23, and a nozzle unit 25. The material generation unit 21 plasticizes at least a part of the shaping material containing the thermoplastic resin to generate the plasticized material. The plasticized material will be described later. The fiber introducing unit 23 introduces a fiber material FB into the plasticized material generated by the material generation unit 21. In the present embodiment, the fiber material FB is formed of a covered fiber material in which a surface thereof is covered with a covering material to be described later. The fiber material FB will be described later. The nozzle unit 25 discharges the plasticized material. More detailed configurations of the material generation unit 21, the nozzle unit 25, and the fiber introducing unit 23 will be described below in this order.

The material generation unit 21 includes a material supply unit 30 and a plasticizing unit 35. The material supply unit 30 supplies the shaping material, which is a raw material for generating the plasticized material, to the plasticizing unit 35. In the present embodiment, the material supply unit 30 is configured as a so-called hopper, and includes a material accommodation unit 31 that accommodates a supplied shaping material, and a communication path 32 that is coupled to a discharge port below the material supply unit 30 and that guides the shaping material from the material supply unit 30 to the plasticizing unit 35.

The shaping material is supplied to the material supply unit 30 in a form of pellets. The shaping material contains a thermoplastic resin as a main component. Examples of the thermoplastic resin contained in the shaping material include, for example, polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), and the like. In addition to the above-described thermoplastic resin, a pigment, a metal, a ceramic, or the like may be mixed in the shaping material to be supplied to the material supply unit 30. The shaping material may not be supplied to the material supply unit 30 as pellets, and may be supplied in a state of a solid material such as powder.

The plasticizing unit 35 plasticizes at least a part of the thermoplastic resin contained in the shaping material supplied from the material supply unit 30 to generate the plasticized material, and sends the plasticized material to the nozzle unit 25. The plasticizing unit 35 can also be referred to as a plasticizing apparatus 35. The plasticizing unit 35 includes a screw case 36, a drive motor 37, a flat screw 40, and a facing portion 50.

The flat screw 40 is a substantially cylindrical screw whose height in an axial direction along a rotation axis RX is smaller than a diameter. The rotation axis RX coincides with a central axis of the flat screw 40. In FIG. 1, the rotation axis RX of the flat screw 40 is shown by a dashed line. The flat screw 40 is disposed on the facing portion 50 such that the rotation axis RX is parallel to the Z direction, and rotates in a circumferential direction. A lower surface 41 of the flat screw 40 facing the facing portion 50 has a spiral groove portion 42 extending from a side surface toward the rotation axis RX. Hereinafter, the lower surface 41 of the flat screw 40 is also referred to as a "groove forming surface 41". The communication path 32 of the material supply unit 30 is coupled to the groove portion 42 at a side surface of the flat screw 40. A specific configuration of the flat screw 40 will be described later.

The flat screw 40 is housed in the screw case 36. An upper surface 43 of the flat screw 40 is coupled to the drive motor 37. The flat screw 40 is rotated in the screw case 36 by a rotational driving force generated by the driving motor 37. The drive motor 37 is driven under the control of the control unit 10.

The facing portion 50 is also referred to as a barrel, and is configured by a substantially cylindrical member whose height in a direction along a central axis is smaller than a diameter thereof. In the present embodiment, the facing portion 50 is disposed such that the central axis thereof coincides with the rotation axis RX of the flat screw 40.

The facing portion 50 has a facing surface 51 facing the groove forming surface 41 of the flat screw 40. A space is formed between the groove portion 42 of the groove forming surface 41 and the facing surface 51 of the facing portion 50. The shaping material supplied from the material supply unit 30 flows into this space from the side surface of the flat screw 40. The shaping material supplied to the space in the groove portion 42 is guided to a center of the flat screw 40 by rotation of the spiral groove portion 42 when the flat screw 40 rotates.

A heater 52 for heating the shaping material is embedded in the facing surface 51 of the facing portion 50. The heater 52 heats the flat screw 40 or the facing portion 50. In another embodiment, the heater 52 may be embedded in the flat screw 40, or may be disposed separately from the flat screw 40 or the facing portion 50. A communication hole 53, which penetrates the facing portion 50 along a central axis of the facing portion 50, is provided at a center of the facing surface 51. As will be described later, the communication hole 53 communicates with a nozzle opening 28 via an introduction flow path 26 and a nozzle flow path of the nozzle unit 25. The communication hole 53 constitutes a flow path having a substantially circular cross section. While the thermoplastic resin contained in the shaping material is plasticized and converted into the plasticized material by the heating of the heater 52, the shaping material supplied to the groove portion 42 of the flat screw 40 is guided to the communication hole 53 opened at the center of the facing surface 51 along the groove portion 42 by rotation of the flat screw 40. A downstream end of the communication hole 53 is coupled to the nozzle unit 25. The plasticized material generated by the rotation of the flat screw 40 is supplied to the nozzle unit 25 through the communication hole 53.

In the present embodiment, the facing surface 51 of the facing portion 50 has an introduction groove 57 that guides the fiber material FB from the side of the flat screw 40 or a side of the facing portion 50 to the communication hole 53. In FIG. 1, the introduction groove 57 is shown by a broken line for convenience. A configuration of the introduction groove 57 will be described later.

The nozzle unit 25 includes the introduction flow path 26, the nozzle flow path 27, the nozzle opening 28, and a discharge amount control mechanism 80. The introduction flow path 26 is coupled to the downstream end of the communication hole 53 of the facing portion 50, and is formed linearly from the downstream end of the communication hole 53 along the Z direction. The introduction flow path 26 constitutes a flow path having a substantially circular cross section, and is formed such that a central axis of the introduction flow path coincides with the rotation axis RX of the flat screw 40. In the present embodiment, a diameter of the introduction flow path 26 is substantially equal to a diameter of the communication hole 53 of the facing portion 50.

The nozzle flow path 27 is coupled to a downstream end of the introduction flow path 26, and is formed linearly from the downstream end of the introduction flow path 26 along the Z direction. The nozzle flow path 27 constitutes a flow path having a substantially circular cross section, and is formed such that a central axis of the nozzle flow path coincides with the rotation axis RX of the flat screw 40. The nozzle flow path 27 has a reduced diameter at a downstream end portion thereof. In the present embodiment, the diameter of the nozzle flow path 27 is, except for the downstream end portion thereof, substantially equal to the diameter of the introduction flow path 26. The nozzle opening 28 is an opening having a hole diameter Dn that is formed at the downstream end portion of the nozzle flow path 27 and that opens in the Z direction. The hole diameter Dn of the nozzle opening 28 may be, for example, from 50 μm to 3 mm. In another embodiment, the hole diameter Dn may be smaller than 50 μm or larger than 3 mm. The plasticized material introduced from the material generation unit 21 to the nozzle unit 25 is discharged from the nozzle opening 28 via the introduction flow path 26 and the nozzle flow path 27.

The discharge amount control mechanism 80 is provided in the introduction flow path 26. The discharge amount control mechanism 80 controls a flow rate of the plasticized material in the introduction flow path 26 to control a discharge amount of the plasticized material from the nozzle opening 28. In the present embodiment, the discharge amount control mechanism 80 is configured by a butterfly valve that is a valve element that rotates in the introduction flow path 26 under the control of the control unit 10. An opening area of the introduction flow path 26 varies depending on a rotation angle of the butterfly valve. The control unit 10 controls the flow rate of the plasticized material in the introduction flow path 26 by controlling the rotation angle of the valve element. The discharge amount control mechanism 80 can close the introduction flow path 26 so as to stop a flow of the plasticized material in the introduction flow path 26. The discharge amount control mechanism 80 may not be provided in the introduction flow path 26, and may be provided in the nozzle flow path 27. In addition, the discharge amount control mechanism 80 may not be provided in the nozzle unit 25, and may be provided in the communication hole 53 of the facing portion 50, for example. The discharge amount control mechanism 80 may be omitted, or may be a configuration other than the butterfly valve.

The fiber introducing unit 23 has a function of introducing the fiber material FB into the plasticized material before being discharged from the nozzle opening 28 under the control of the control unit 10. In the present embodiment, the fiber material FB is a continuous linear member wound around a reel 62 to be described later. In addition, the fiber material FB is configured by a fiber bundle in which a plurality of fibers are bundled. In the present embodiment, the fiber material FB has a configuration in which a plurality of carbon fibers are bundled by a sizing agent. In another embodiment, the fiber material FB may not be formed of carbon fibers, may be formed of, for example, glass fibers, or may be formed of various fibers having a higher elastic modulus than the resin material.

The fiber diameter of the fiber material FB may be, for example, from 10 μm to the hole diameter Dn of the nozzle opening 28. In the present embodiment, since the hole diameter Dn of the nozzle opening 28 is 3 mm or less as described above, the fiber diameter of the fiber material FB may be 3 mm or less. In the present disclosure, the "fiber diameter" of the fiber material corresponds to a dimension of a maximum width in a cross section orthogonal to a length direction of the fiber material. Therefore, for example, when a cross-sectional shape of the fiber material is substantially a circle, the fiber diameter corresponds to a maximum value of a diameter of the circle. When the cross-sectional shape of the fiber material is substantially a quadrangle, the fiber diameter corresponds to the larger one of side lengths of the quadrangle. When the cross-sectional shape of the fiber material is substantially an ellipse, the fiber diameter corresponds to a major axis of the ellipse. In the present embodiment, the cross section of the fiber material FB perpendicular to the length direction has a substantially circular shape. In the present embodiment, a surface of the fiber material FB is covered with a covering material CM in advance. The covering material CM will be described later.

The fiber introducing unit 23 includes a conveying unit 60 that conveys the fiber material FB in order to introduce the fiber material FB. The conveying unit 60 includes an accommodation unit 63 that accommodates the fiber material FB wound around the reel 62, a conveying path that sends out the fiber material FB from the accommodation unit 63, and a cutting unit 66 that cuts the fiber material FB.

The accommodation unit 63 is provided with a conveying motor, which is not shown, that generates a conveying force for rotating the reel 62 to send out the fiber material FB through the conveying path 65. A rotation speed of the conveying motor is controlled by the control unit 10. The conveying path 65 is a cylindrical tubular member through which the fiber material FB is inserted. In the present embodiment, the conveying path 65 is coupled to the introduction groove 57 of the facing portion 50. At an inlet of the introduction groove 57, the fiber material FB that is conveyed to the introduction groove 57 through the conveying path 65 is introduced into the shaping material to be supplied to a material inlet 46 of the flat screw 40. The fiber material FB is guided to the communication hole 53 along the introduction groove 57 by the rotation of the flat screw 40 and a flow of the plasticized material toward the communication hole 53 during the plasticization, and is discharged from the nozzle opening 28 together with the plasticized material. Shaping of the shaped object by discharging the plasticized material will be described later.

The cutting unit 66 is disposed in the middle of the conveying path 65, and cuts the fiber material FB to be sent out through the conveying path 65 under the control of the control unit 10. The cutting unit 66 may be configured by, for example, a mechanism in which a cutter blade protrudes by a solenoid mechanism to cut the fiber material FB. In another embodiment, the cutting unit 66 may be a configuration of cutting the fiber material FB by emitting a laser.

The shaping stage unit 70 is disposed at a position at which the shaping stage unit faces the nozzle opening 28 of the discharging unit 20. The shaping stage unit 70 includes a stage 72 that supports the shaped object, a shaping table 73 that is placed on the stage 72, and a moving mechanism 75 that is configured to move the stage 72 in the X, Y, and Z directions. The stage 72 is formed of a plate-shaped member and has a stage surface 72s arranged along a horizontal direction. The shaping table 73 is formed of a plate-shaped member, is placed on the stage surface 72s, and receives the plasticized material discharged from the nozzle opening 28. The moving mechanism 75 is configured as a three-axis positioner that moves the stage 72 in three axial directions of the X, Y, and Z directions, and includes three motors M that generate driving forces under the control of the control unit 10. In the shaping processing, the control unit 10 controls the moving mechanism 75 to relatively move the nozzle unit 25 and the stage 72.

In another embodiment, instead of the configuration in which the stage 72 is moved by the moving mechanism 75, a configuration may be adopted in which the moving mechanism 75 moves, in a state in which a position of the stage 72 is fixed, the nozzle unit 25 with respect to the stage 72. Even with such a configuration, the stage and the nozzle unit 25 can be relatively moved. In another embodiment, a configuration may be adopted in which the moving mechanism 75 moves each of the stage 72 and the nozzle unit 25 to change a relative position between the stage 72 and the nozzle unit 25.

Figure 2:
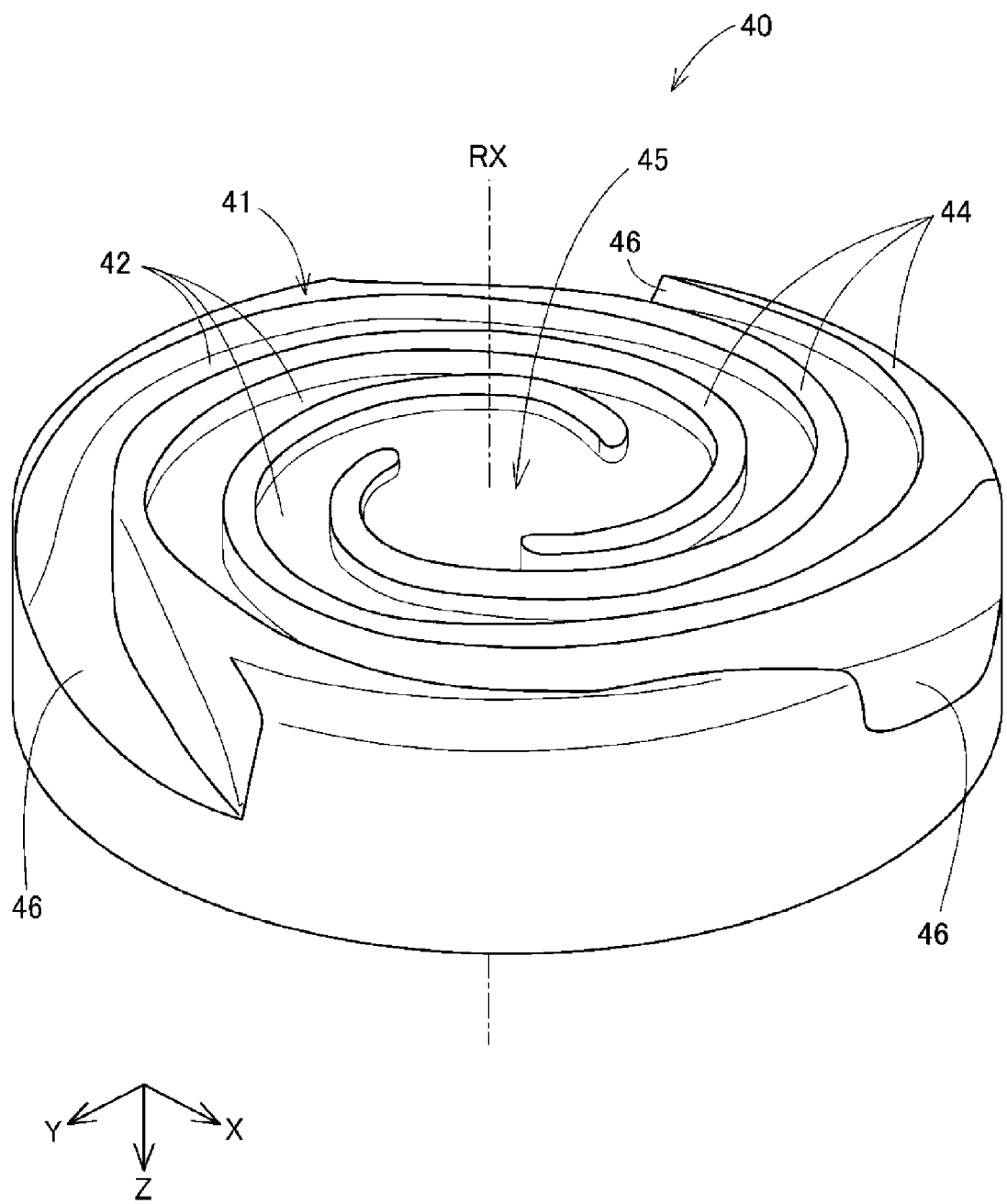
FIG. 2 is a schematic perspective view showing a configuration of a flat screw.

FIG. 2 is a schematic perspective view showing the configuration of the flat screw 40 when viewed from the groove forming surface 41 side. In FIG. 2, the rotation axis RX of the flat screw 40 is shown by a dashed line. In the present embodiment, the flat screw 40 has a configuration in which three groove portions 42 extend in parallel in a spiral arc toward a central portion 45 of the flat screw 40. The groove portions 42 are respectively defined by three ridge portions 44 extending spirally toward a recessed portion of the central portion 45.

The number of the groove portions 42 of the flat screw 40 may not be three. The flat screw 40 may have only one groove portion 42, or may have two or more groove portions 42. In addition, any number of the ridge portions 44 may be provided in accordance with the number of the groove portions 42. Further, the groove portion 42 may extend in a spiral arc, and may not necessarily extend spirally.

One end of the groove portion 42 is opened at the side surface of the flat screw 40, and constitutes the material inlet 46 that receives the shaping material supplied from the communication path 32. The groove portion 42 continues to the central portion 45 of the flat screw 40, and the other end of the groove portion 42 is coupled to the central portion 45 of the flat screw 40. The central portion 45 of the flat screw 40 constitutes a recessed portion in which the plasticized material gathers. The plasticized material is formed by plasticizing the thermoplastic resin of the shaping material.

Figure 3:
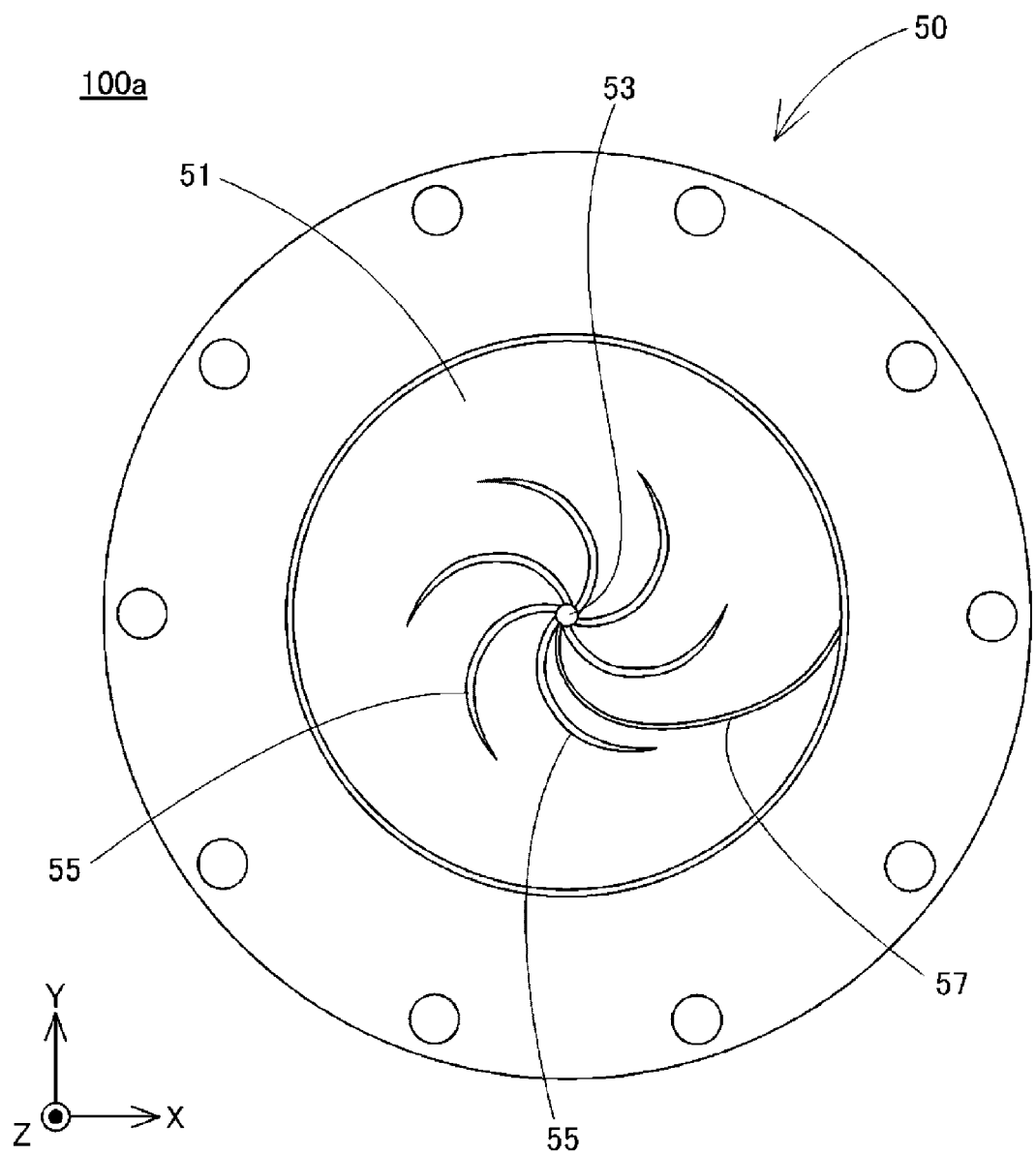
FIG. 3 is a schematic plan view showing a configuration of a facing surface of a facing portion.

FIG. 3 is a schematic plan view showing a configuration of the facing surface 51 of the facing portion 50. As described above, the facing surface 51 faces the groove forming surface 41 of the flat screw 40. At the center of the facing surface 51, the above-described communication hole 53, which is used for supplying the plasticized material flowing into the central portion 45 of the flat screw 40 to the nozzle unit 25, is opened. The facing surface 51 has a plurality of guide grooves 55 that have one end coupled to the communication hole 53, and that extend spirally from the communication hole 53 toward an outer periphery. The guide groove 55 has a function of guiding the plasticized material to the communication hole 53.

The heater 52 shown in FIG. 1 is embedded in the facing portion 50. The plasticization of the thermoplastic resin in the plasticizing unit 35 is achieved by the heating of the heater 52 in the facing portion 50 and the rotation of the flat screw 40. According to the shaping apparatus 100a, a size of an apparatus configuration for plasticizing the thermoplastic resin can be reduced with the flat screw 40. In addition, according to the shaping apparatus 100a, control of a pressure or the flow rate of the plasticized material to be supplied to the nozzle unit 25 can be facilitated by rotation control of the flat screw 40. Therefore, accuracy of discharging the plasticized material from the nozzle unit 25 can be increased, and accuracy of shaping the shaped object can be increased.

As described above, the facing surface 51 of the facing portion 50 further has the introduction groove 57. The introduction groove 57 is formed to avoid interference with the guide groove 55 from an outer peripheral end of the facing surface 51 to the communication hole 53. As described above, the fiber introducing unit 23 introduces the fiber material FB from the side of the flat screw 40 to the introduction groove 57, and guides the fiber material FB to the communication hole 53 along the introduction groove 57.

Figure 4:
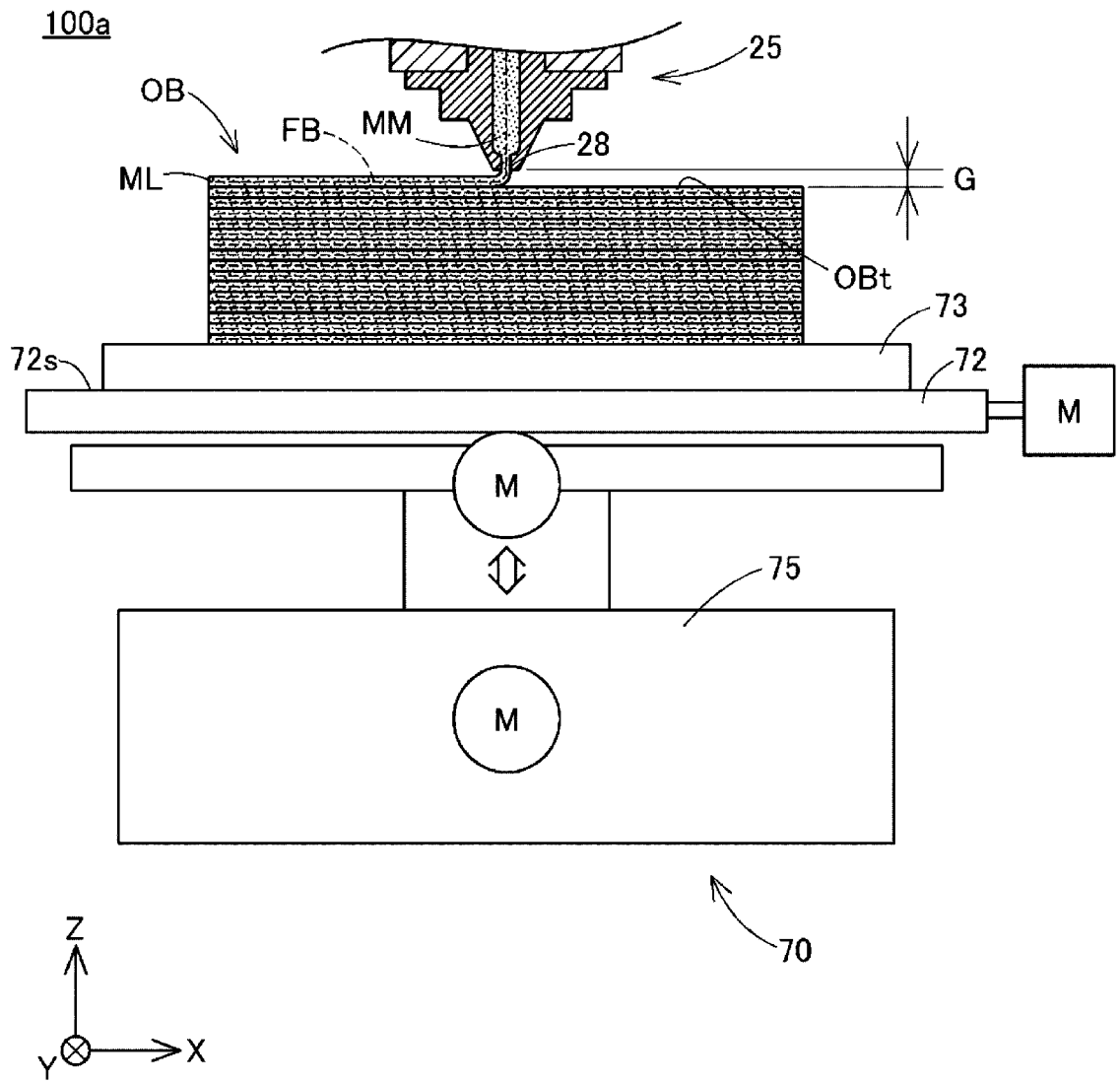
FIG. 4 is a schematic diagram schematically showing how a three-dimensional shaped object is shaped.

FIG. 4 is a schematic diagram schematically showing how a shaping layer ML formed by discharging a plasticized material MM from the nozzle opening 28 is laminated to shape a shaped object OB in the shaping apparatus 100a. In FIG. 4, the fiber material FB is shown by a broken line for convenience.

In the shaping processing of the shaping apparatus 100a, the plasticized material MM is discharged together with the fiber material FB from the nozzle opening 28 while the nozzle unit 25 and the stage 72 are relatively moved in the horizontal direction. Thus, the plasticized material MM is linearly deposited on the stage 72 in a state in which the plasticized material MM contains the fiber material FB so as to draw a movement trajectory of the nozzle opening 28, and the shaping layer ML is formed. The shaped object OB is formed by further discharging the plasticized material MM onto the shaping layer ML and laminating the shaping layer ML.

In the shaping apparatus 100a, a gap G is maintained between the nozzle opening 28 and an upper surface OBt of the shaped object OB being shaped. Here, "the upper surface OBt of the shaped object OB" refers to a planned place where the plasticized material MM discharged from the nozzle opening 28 is to be deposited near a position directly below the nozzle opening 28. The gap G is adjusted by the moving mechanism 75 changing a relative position between the stage 72 and the nozzle opening 28 in the Z direction.

A size of the gap G is preferably equal to or smaller than the hole diameter Dn of the nozzle opening 28 shown in FIG. 1, and more preferably equal to or smaller than 0.8 times the hole diameter Dn. Thus, the plasticized material MM discharged from the nozzle opening 28 can be deposited on the upper surface OBt of the shaped object OB, while sufficiently securing a contact surface with the upper surface OBt of the shaped object OB being shaped. As a result, generation of a gap in a cross section of the shaping layer ML and deformation of a shape of the upper surface OBt of the shaped object OB can be prevented, strength of the shaped object OB can be secured, and a surface roughness of the shaped object OB can be reduced. In a configuration in which the heater is provided around the nozzle opening 28, by forming the gap G, a decrease in a temperature of the upper surface OBt of the shaped object OB can be appropriately controlled by the heater, and a decrease in adhesion between the laminated shaping layers ML can be prevented. Therefore, interlayer strength of the shaped object OB can be secured. Further, by forming the gap G, shape collapse, discoloration, and deterioration due to overheating of the deposited plasticized material MM by the heater can be prevented.

The size of the gap G is preferably 0.5 times or less the hole diameter Dn, and particularly preferably 0.3 times or less the hole diameter Dn. Accordingly, the plasticized material MM can be accurately deposited at the planned place. A decrease in adhesion between the plasticized material MM and the upper surface OBt, when the plasticized material MM is discharged to the upper surface OBt of the shaped object OB, can be prevented, and a decrease in the adhesion between the laminated shaping layers ML can be prevented.

In the present embodiment, the plasticized material MM solidifies due to a decrease in a temperature after being discharged from the nozzle opening 28. In another embodiment, the plasticized material MM may be a material that is cured by a sintering step of sintering the shaped object OB in a sintering furnace after the shaping of the shaped object OB is completed. Further, the plasticized material MM may be a material that is photocured by irradiation with an ultraviolet laser after being discharged from the nozzle opening 28. In this case, the shaping apparatus 100a may include a laser irradiation device for curing the plasticized material MM.

Figure 5:
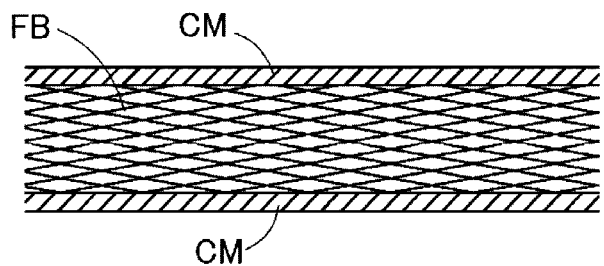
FIG. 5 is a schematic cross-sectional view showing a configuration of a fiber material.

FIG. 5 is a schematic cross-sectional view showing a cross section passing through the central axis of the fiber material FB that is introduced by the fiber introducing unit 23. In the present embodiment, the surface of the fiber material FB is covered with the covering material CM. Accordingly, when the fiber material FB that is introduced into the shaping material is mixed with the plasticized material in the flat screw 40, air bubbles can be prevented from adhering to the surface of the fiber material FB and being mixed in the plasticized material. Therefore, a decrease in strength of the shaped object due to the mixing of the air bubbles into the plasticized material can be prevented.

The covering material CM preferably covers the entire surface of the fiber material FB, but may not completely cover the entire surface of the fiber material FB. A part of the fiber material FB may be exposed from the covering material CM. For example, 50% or more of a surface area of the fiber material FB may be exposed from the covering material CM.

The covering material CM is made of a material that is more compatible with the plasticized material than the surface of the fiber material FB. In the present embodiment, an absolute value of a difference between an SP value of the thermoplastic resin contained in the shaping material and an SP value of the covering material CM is 5.0 or less. The "SP value" is also referred to as a solubility parameter, which is a physical property value indicating solubility of a polymer material in a solvent. In general, polymer materials are more soluble in solvents with closer SP values. The absolute value is preferably 3.0 or less, and more preferably 1.0 or less. Accordingly, the surface of the fiber material FB and the plasticized material can be more easily compatible with each other, and air bubbles can be further prevented from being mixed into the plasticized material.

In the present embodiment, the covering material CM includes a thermoplastic resin of the same type as the thermoplastic resin of plasticized material. When the thermoplastic resin of the plasticized material is ABS, the covering material CM includes ABS. Alternatively, when the thermoplastic resin of the plasticized material is ABS, the covering material CM may contain polystyrene, nylon, PEEK, or the like. When the thermoplastic resin of the plasticized material is nylon, the covering material CM includes nylon. Alternatively, when the thermoplastic resin of the plasticized material is nylon, the covering material CM may include ABS, polystyrene, PEEK, or the like. When the thermoplastic resin of the plasticized material is polystyrene, the covering material CM contains polystyrene. Alternatively, when the thermoplastic resin of the plasticized material is polystyrene, the covering material CM may include ABS, nylon, PEEK, or the like. Accordingly, since the covering material CM is more easily compatible with the thermoplastic resin of the plasticized material, air bubbles can be further prevented from being mixed into the plasticized material.

Figure 6:
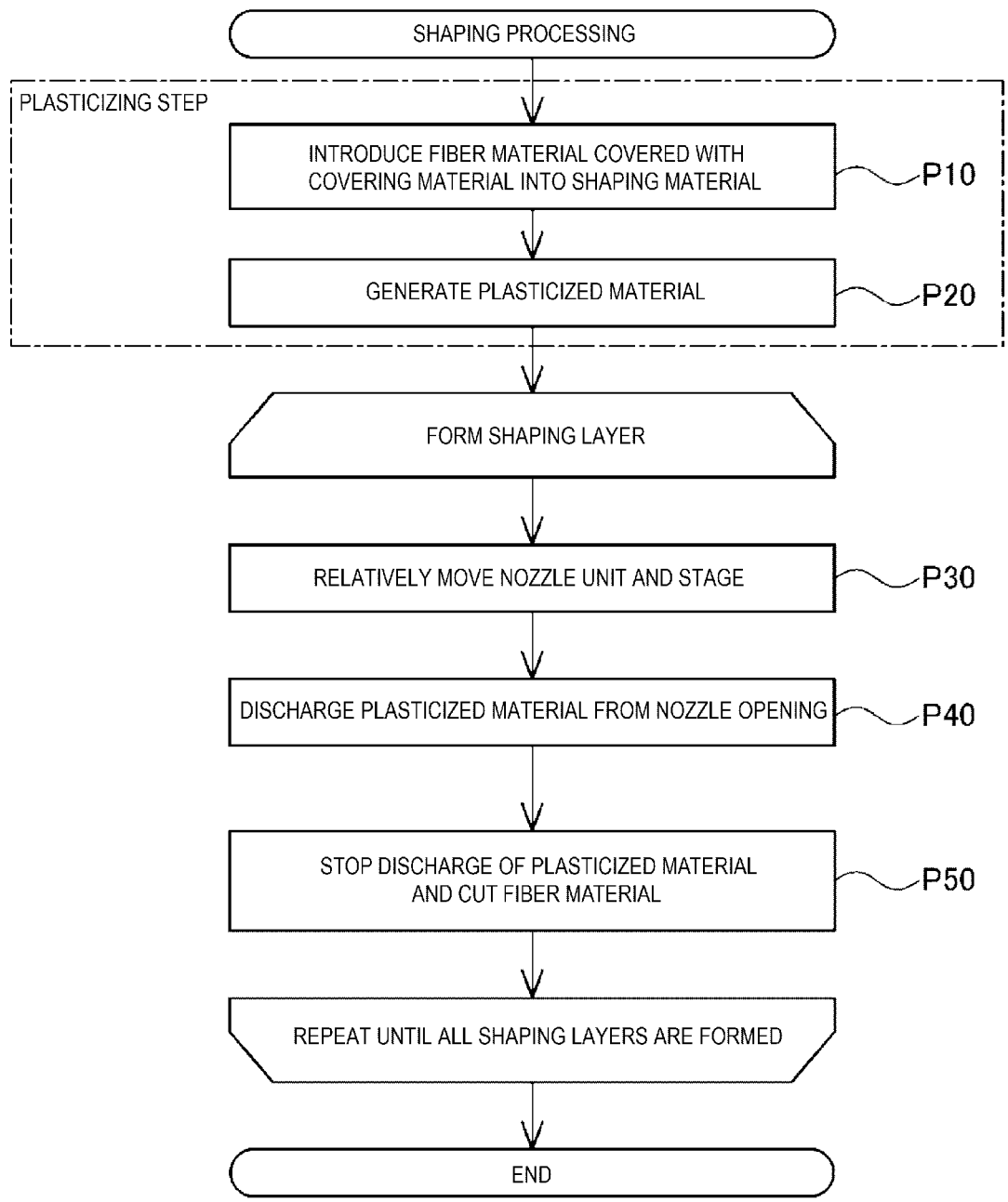
FIG. 6 is a flowchart showing steps executed in shaping processing according to the first embodiment.

FIG. 6 is a flowchart showing steps executed in the shaping processing by the shaping apparatus 100a. In the shaping processing, the control unit 10 mainly controls the plasticizing unit 35, the discharging unit 20, and the fiber introducing unit 23 to shape the shaped object including the fiber material FB that is the covered fiber material. The shaping processing is executed based on shaping data for forming a shaping layer that constitutes the shaped object. The shaping data is generated based on three-dimensional shape data that represent a shape of the shaped object, such as three-dimensional CAD data. The shaping data includes, for example, information on a position of the shaping layer in the shaped object, information on a dimension of the shaping layer, information on a movement path of the nozzle opening 28, information on the discharge amount of the plasticized material, and the like.

Steps P10 and P20 correspond to a plasticizing step of plasticizing at least a part of the shaping material containing the thermoplastic resin to generate the plasticized material used for shaping the shaped object. During the shaping processing, step P10 and step P20 are executed in parallel. Step P10 is intermittently executed under the control of the control unit 10 during the shaping processing, step P20 continues to be executed at least while steps P30 to P50 to be described below are executed during the shaping processing.

Step P10 is a step executed by the fiber introducing unit 23 under the control of the control unit 10, and corresponds to the fiber introducing step. In the plasticizing step, step P10 corresponds to a step of introducing the fiber material FB covered with the covering material CM into the shaping material before being discharged from the nozzle opening 28. In step P10, the fiber material FB covered with the covering material CM is introduced through the introduction groove 57 from a position that is on the side of the facing portion 50 and is on the side of the flat screw 40. As described above, the fiber material FB is introduced into the shaping material supplied from the material accommodation unit 31 to the material inlet 46 of the flat screw 40 at the inlet of the introduction groove 57.

As described above, the fiber introducing step in step P10 is intermittently executed under the control of the control unit 10 during the shaping processing. The fiber introducing unit 23 executes the introduction of the fiber material FB when a command of introducing the fiber material FB is issued from the control unit 10 at the time of executing the discharge of the plasticized material from the nozzle opening 28 in step P40 to be described later. In addition, the fiber introducing unit 23 stops the introduction of the fiber material FB when a command of stopping the introduction of the fiber material FB is issued from the control unit 10.

In step P20, the plasticizing unit 35 of the material generation unit 21 plasticizes the shaping material to generate the plasticized material. In the present embodiment, as described above, the thermoplastic resin is plasticized using the flat screw 40. Step P20 includes a step of introducing the shaping material of the material supply unit 30 into the groove portion 42 of the flat screw 40 while rotating the flat screw 40 in a state in which the flat screw 40 faces the facing portion 50, and guiding at least a part of the thermoplastic resin contained in the shaping material to the communication hole 53 of the facing portion 50 while plasticizing the thermoplastic resin in the groove portion 42. That is, step P20 includes a step of guiding at least a part of the thermoplastic resin that is supplied between the flat screw 40 and the facing portion to the communication hole 53 while plasticizing the thermoplastic resin by the rotation of the flat screw 40 and the heating of the heater 52. As described above, since the flat screw 40 is used in the plasticizing step, a size of the plasticizing unit 35 is reduced. Further, since the control of the pressure and the flow rate of the plasticized material supplied to the nozzle unit 25 is facilitated by the rotation control of the flat screw 40, the accuracy of discharging the plasticized material from the nozzle unit 25 can be increased, and the accuracy of shaping the shaped object can be increased.

In steps P10 to P20 according to the present embodiment, since the fiber material FB to be introduced into the plasticized material discharged from the nozzle opening 28 is covered with the covering material CM, air bubbles are effectively prevented from being mixed into the plasticizing material due to a fact that the thermoplastic resin of the plasticizing material and the fiber material FB are difficult to be compatible with each other. Further, in steps P10 to P20 according to the present embodiment, the fiber material FB covered with the covering material CM is sent, by the flat screw 40, to the communication hole 53 together with the plasticized material that is being plasticized. According to this configuration, the plasticized material can be more compatible with the fiber material FB by using a pressure in the groove portion 42 of the flat screw 40 increasing toward the communication hole 53. Therefore, air bubbles can be further prevented from being mixed into the plasticizing material when introducing the fiber material FB into the plasticized material. The fiber material FB can be guided to the communication hole 53 by using the rotation of the flat screw 40, which is efficient.

Steps P30 to P50 correspond to an operation for one pass in the shaping apparatus 100a. The "pass" refers to a processing unit in which the nozzle opening 28 is scanned while continuously discharging the plasticized material from the nozzle opening 28 without interruption, and one continuous shaping part is formed on the stage 72. In the shaping apparatus 100a, one shaping layer is formed by executing a series of operations of steps P30 to P50 once or more. In the shaping processing of the present embodiment, steps P30 to P50 are repeated until all the shaping layers to be laminated are formed, and the shaping of the shaped object is completed.

The shaping apparatus 100a executes step P40 while executing step P30.

Step P30 is a step that is executed by the moving mechanism 75 under the control of the control unit 10, and corresponds to a moving step of relatively moving the stage 72 and the nozzle unit 25. Under the control of the control unit 10, the moving mechanism 75 relatively moves the stage and the nozzle unit 25 at a relative movement speed determined in advance based on the shaping data.

Step P40 corresponds to a discharging step in which the discharging unit 20 discharges the plasticized material from the nozzle opening 28 under the control of the control unit 10. The discharging unit 20 discharges the plasticized material from the nozzle opening 28 in a discharge amount per unit time determined in advance based on the shaping data. The control unit 10 controls the discharge amount of the plasticized material per unit time by controlling the number of rotations of the flat screw 40 and an opening degree of the discharge amount control mechanism 80.

In step P50, the control unit 10 stops the discharge of the plasticized material from the nozzle opening 28 at a timing when one pass ends. First, the control unit 10 controls the cutting unit 66 to cut the fiber material FB, and stops the introduction of the fiber material FB from the fiber introducing unit 23. Subsequently, the control unit 10 controls the discharge amount control mechanism 80 to stop the supply of the plasticized material to the nozzle unit 25. Thus, the operation for one pass is completed. As described above, step P50 includes a cutting step of cutting the fiber material FB. Accordingly, adjustment of a length of the fiber material FB to be introduced into the shaped object, control of stopping the introduction of the fiber material FB into the plasticized material, and the like can be easily executed.

In the shaping apparatus 100a, the shaping layer is formed by discharging the plasticized material from the nozzle opening 28 while relatively moving the nozzle unit 25 and the stage 72. As described above, steps P30 to P50 are repeated until all the shaping layers constituting the shaped object are formed, and the shaped object including the fiber material FB, which is the covered fiber material, is shaped. Steps P30 to P50 correspond to a shaping step of forming shaping layers.

As described above, according to the method for manufacturing the shaped object executed by the shaping apparatus 100a according to the first embodiment, the strength of the shaped object is enhanced by introducing the fiber material FB into the plasticized material constituting the shaped object. Since the fiber material FB is introduced into the plasticized material in a state of being covered with the covering material CM, air bubbles are prevented from being mixed into the plasticized material when introducing the fiber material FB. Therefore, the decrease in strength of the shaped object due to the mixing of air bubbles into the plasticized material can be prevented.

2 Second Embodiment

Figure 7:
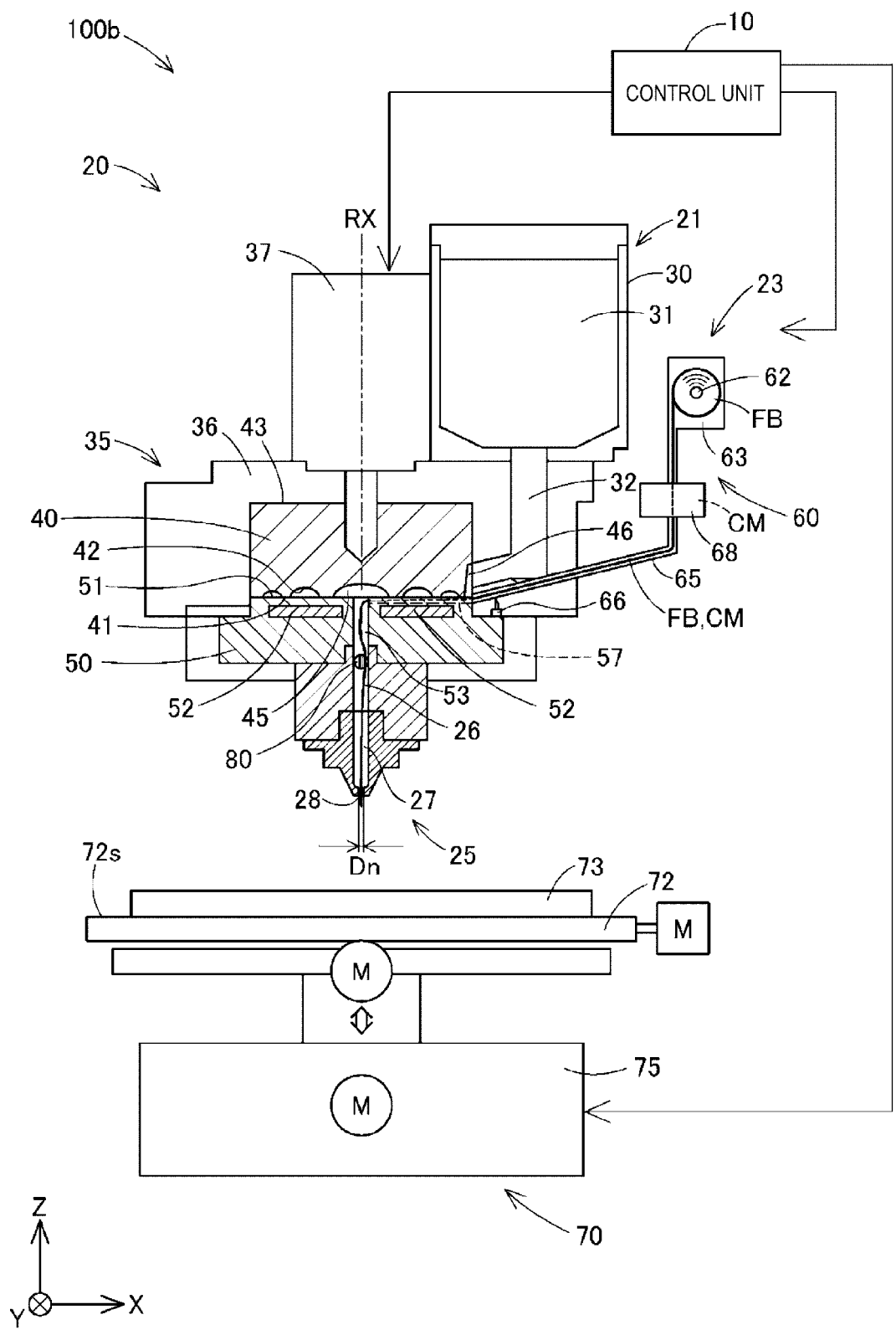
FIG. 7 is a schematic diagram showing a configuration of a three-dimensional shaping apparatus according to a second embodiment.

FIG. 7 is a schematic diagram showing a configuration of a shaping apparatus 100b according to a second embodiment. The shaping apparatus 100b according to the second embodiment has substantially the same configuration as that of the shaping apparatus 100a according to the first embodiment except that the fiber material FB wound around the reel 62 is not covered with the covering material CM and that a storage portion 68 is added in the middle of the conveying path 65. The covering material CM is stored in the storage portion 68. The fiber material FB to be sent out through the conveying path 65 passes through the covering material CM that is stored in the storage portion 68, and the surface of the fiber material FB is covered with the covering material CM.

Figure 8:
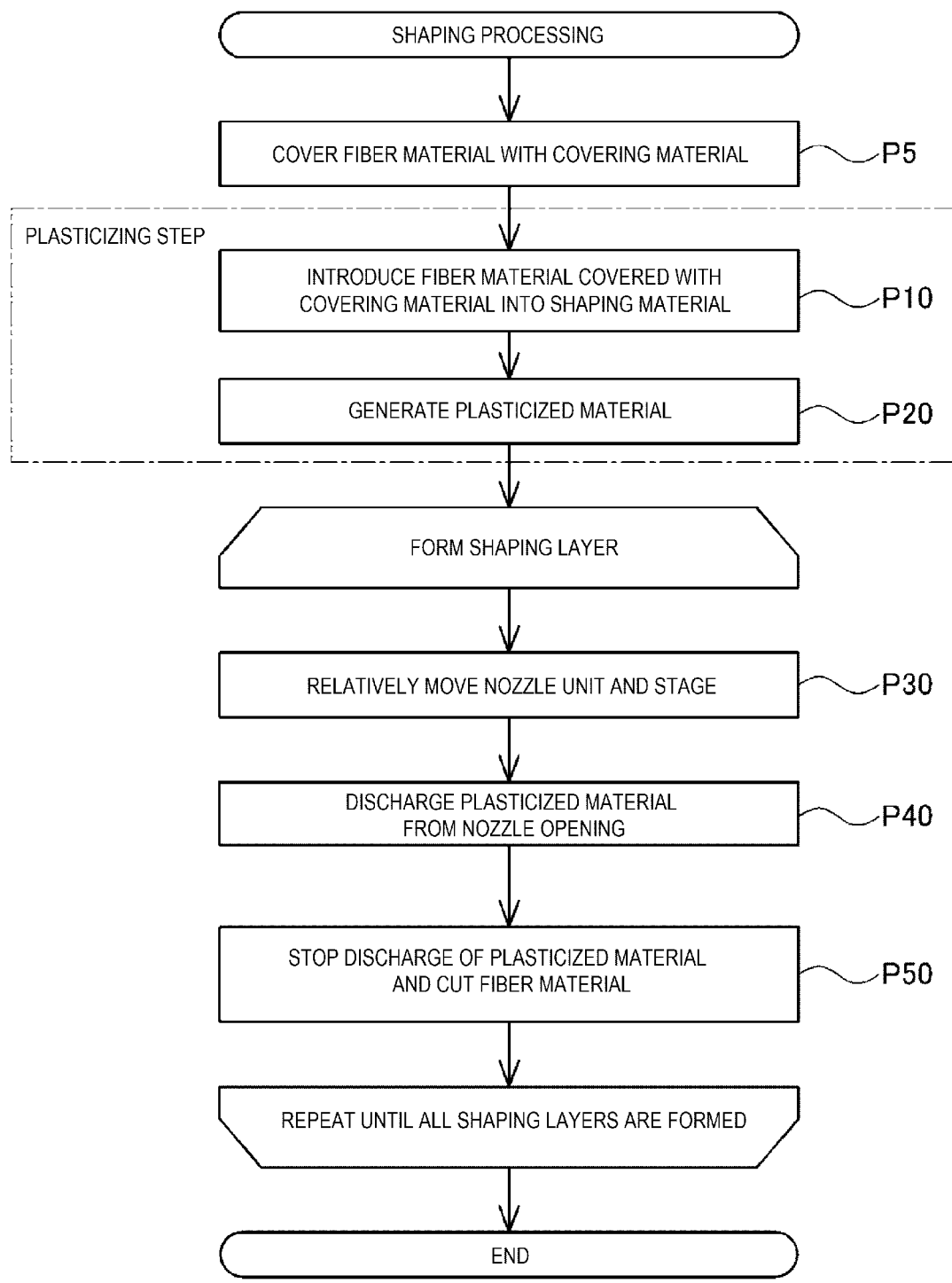
FIG. 8 is a flowchart showing steps executed in shaping processing according to the second embodiment.

FIG. 8 is a flowchart showing steps executed by the shaping apparatus 100b in the shaping processing according to the second embodiment. The flowchart in FIG. is substantially the same as the flowchart in FIG. 6 described in the first embodiment except that step P5 is added. Step P5 corresponds to a covering step of, before the fiber introducing step in step P10, generating the fiber material FB serving as the covered fiber material by passing the fiber material FB through the storage portion 68 in which the covering material CM is stored. According to the shaping processing according to the second embodiment, the surface of the fiber material FB can be easily covered with the covering material CM. A covering processing of the covering material CM is completed only by conveying the fiber material FB, which is efficient.

3 Third Embodiment

Figure 9:
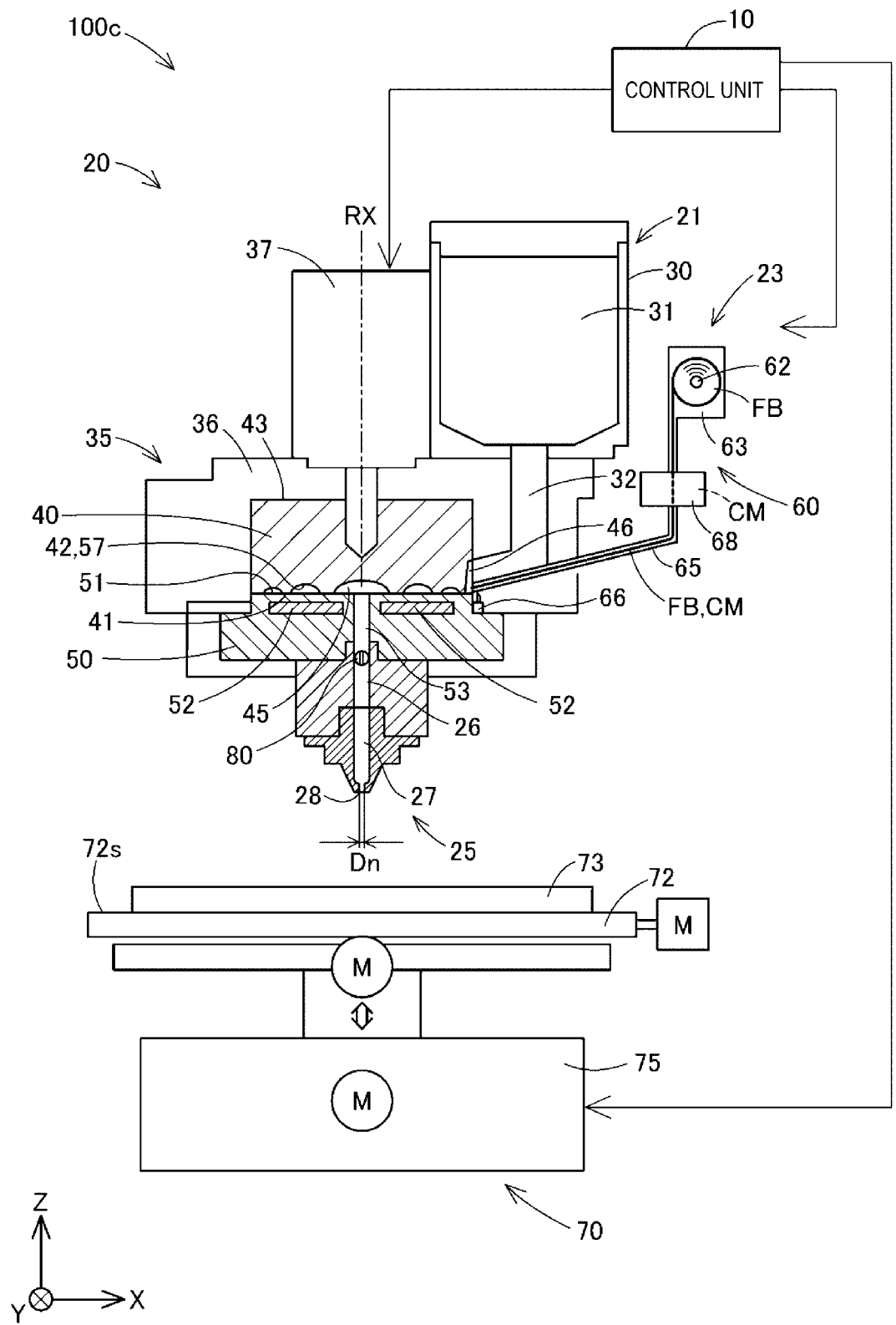
FIG. 9 is a schematic diagram showing a configuration of a three-dimensional shaping apparatus according to a third embodiment.

FIG. 9 is a schematic diagram showing a configuration of a shaping apparatus 100c according to a third embodiment. The shaping apparatus 100c according to the third embodiment has substantially the same configuration as the shaping apparatus 100b according to the second embodiment except that the introduction groove of the facing portion 50 is omitted, and that the conveying path 65 of the fiber introducing unit 23 and the communication path 32 of the material supply portion 30 are coupled to the material inlet 46 of the flat screw 40. In the shaping apparatus 100c according to the third embodiment, the groove portion 42 of the flat screw 40 functions as the introduction groove 57, and the fiber material FB covered with the covering material CM is guided to the communication hole 53 through the groove portion 42. The shaping apparatus 100c according to the third embodiment can also exert various operational effects similar to those described in the second embodiment.

4 Fourth Embodiment

Figure 10:
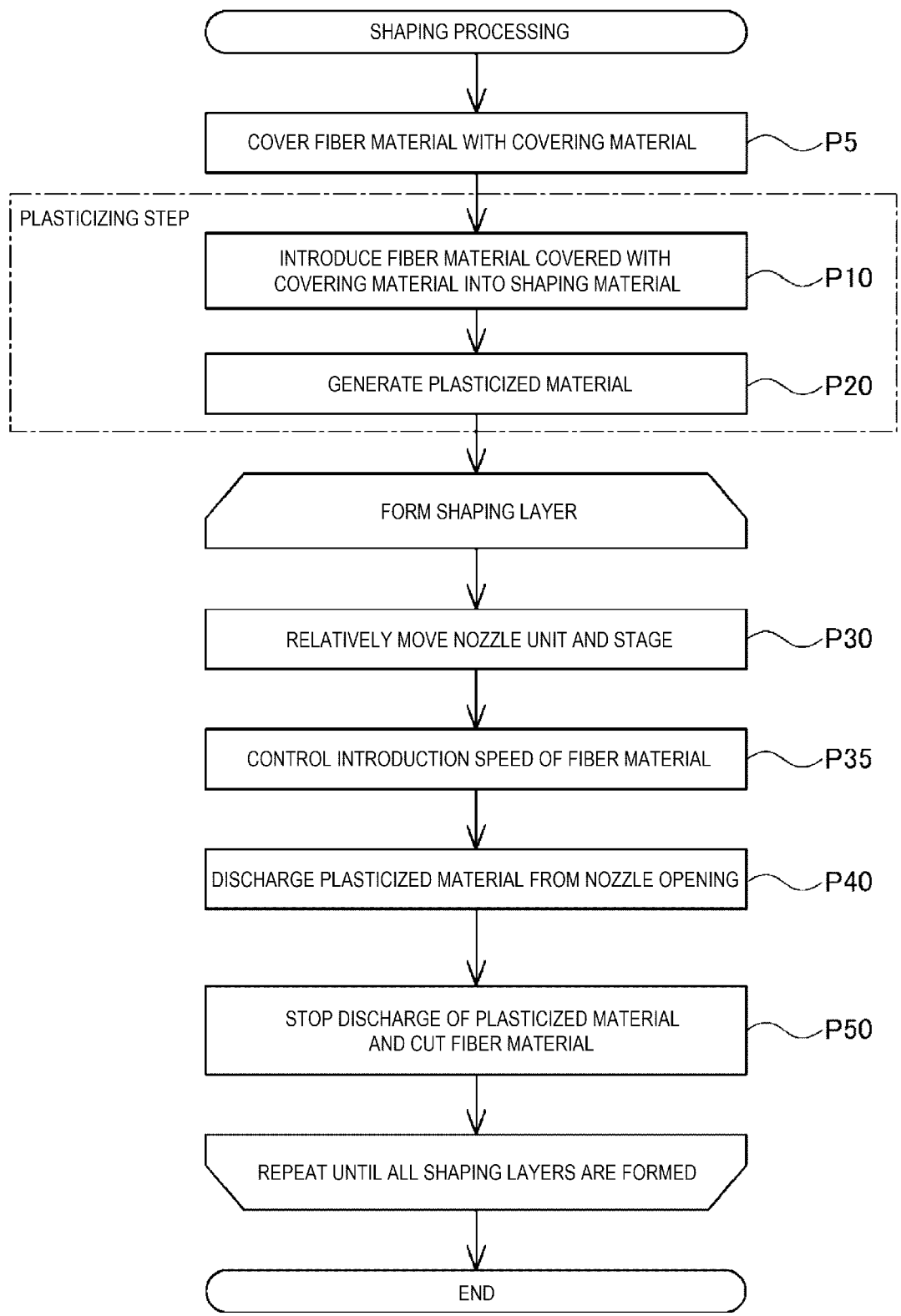
FIG. 10 is a flowchart showing steps executed in shaping processing according to a fourth embodiment.

FIG. 10 is a flowchart showing steps executed in shaping processing according to a fourth embodiment. The flowchart in FIG. 10 is substantially the same as the flowchart in FIG. 8 described in the second embodiment except that step P35 is added. The shaping processing according to the fourth embodiment is executed by the shaping apparatus 100b shown in FIG. 7 described in the second embodiment.

Step P35 corresponds to a fiber introduction control step in which the control unit 10 controls an introduction speed at which the fiber material FB is introduced into the shaping material in accordance with a relative movement speed between the nozzle unit 25 and the stage 72. The "introduction speed" corresponds to a length of the fiber material FB to be send from the conveying path 65 per unit time. In the fourth embodiment, the control unit 10 sets a target value of the introduction speed of the fiber material FB to be larger as the relative movement speed between the nozzle unit 25 and the stage 72 is larger, and controls a rotation speed of the reel 62 around which the fiber material FB is wound according to the target value of the introduction speed.

Thus, since the introduction speed of the fiber material FB is controlled according to the relative movement speed between the nozzle unit 25 and the stage 72, it is possible to prevent a change in an amount or a state of the fiber material FB to be introduced into the plasticized material that is discharged from the nozzle opening 28 and is deposited on the stage 72 due to a change in the relative movement speed between the nozzle unit 25 and the stage 72. Since the introduction speed of the fiber material FB is controlled to be larger as the relative movement speed between the nozzle unit 25 and the stage 72 is larger, the introduction of the fiber material FB into the plasticized material can be prevented from failing to catch up with a forming speed of the shaping layer ML.

5 Fifth Embodiment

Figure 11:
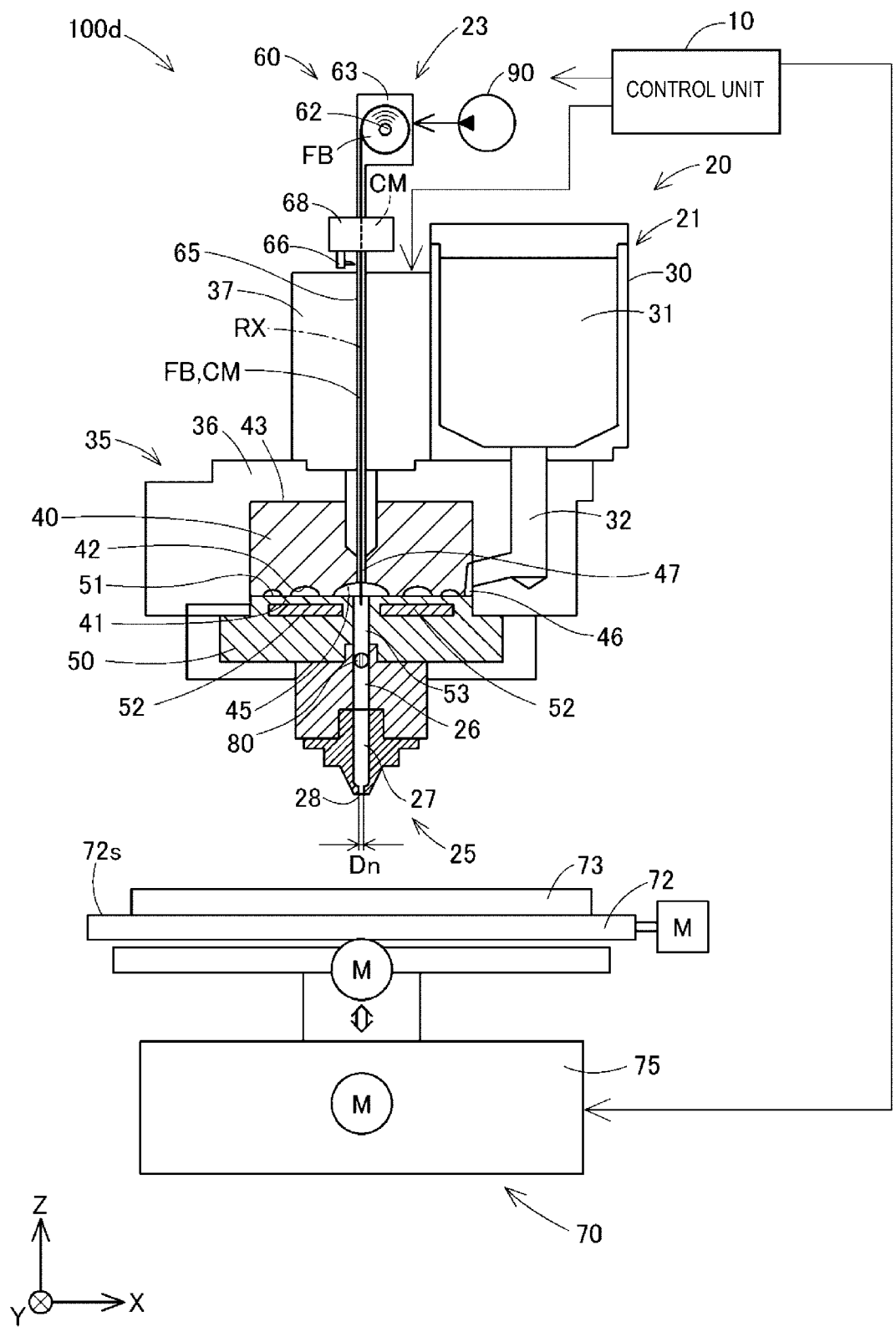
FIG. 11 is a schematic diagram showing a configuration of a three-dimensional shaping apparatus according to a fifth embodiment.

FIG. 11 is a schematic diagram showing a configuration of a shaping apparatus 100d according to a fifth embodiment. The shaping apparatus 100d according to the fifth embodiment has substantially the same configuration as the shaping apparatus 100b according to the second embodiment shown in FIG. 7 except for the following matters. In the shaping apparatus 100d according to the fifth embodiment, the facing portion 50 does not have the introduction groove 57, and the flat screw 40 has a through hole 47. The fiber introducing unit 23 is provided above the plasticizing unit 35, and the conveying path 65 of the fiber introducing unit 23 is coupled to the through hole 47 of the flat screw 40. A pressure control unit 90 is added to the fiber introducing unit 23.

The flat screw 40 of the shaping apparatus 100d has the through hole 47 that penetrates from the upper surface 43 to the central portion 45 of the groove forming surface 41 at a position through which the rotation axis RX passes. The through hole 47 is opened at the groove forming surface 41 and communicates with the communication hole 53 of the facing portion 50. The accommodation unit 63 included in the conveying unit 60 of the fiber introducing unit 23 is disposed on the drive motor 37 of the flat screw 40. The conveying path 65 is coupled to the through hole 47 of the flat screw 40 through a drive shaft of the drive motor 37. Thus, in the fiber introducing step, the fiber material FB is introduced into the plasticized material located at the central portion 45 of the flat screw 40 through the through hole 47 of the flat screw 40.

The pressure control unit 90 is configured by a pump. The pressure control unit 90 is coupled to the accommodation unit 63 of the conveying unit 60, and controls the pressure in the through hole 47 of the flat screw 40 through the accommodation unit 63 and the conveying path 65 under the control of the control unit 10.

Figure 12:
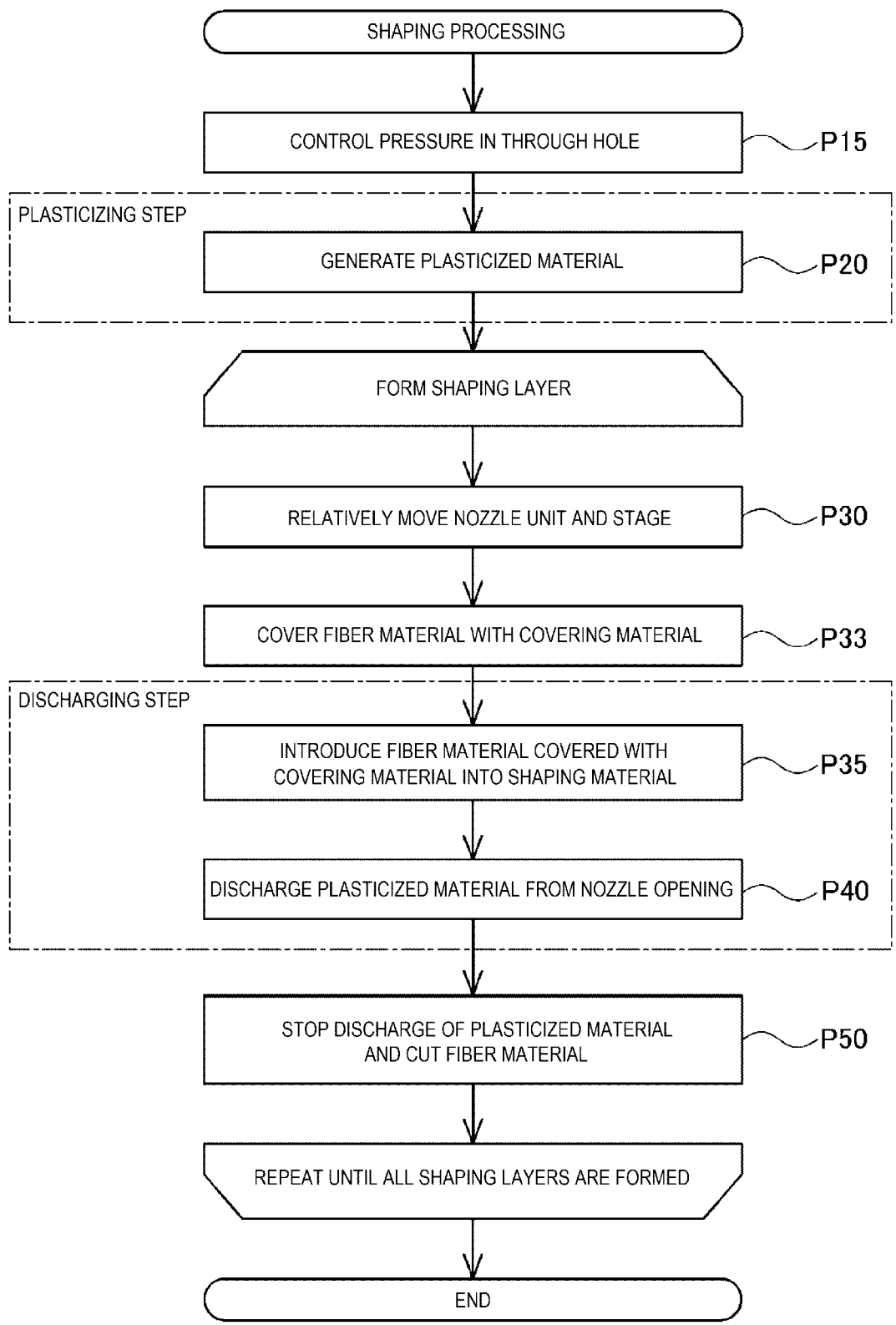
FIG. 12 is a flowchart showing steps executed in shaping processing according to the fifth embodiment.

FIG. 12 is a flowchart showing steps executed by the shaping apparatus 100d in shaping processing according to the fifth embodiment. The flowchart in FIG. 12 is substantially the same as the flowchart in FIG. 8 described in the second embodiment except for the following matters. In FIG. 12, step P15 is added, and instead of step P5 and step P10, step P33 and step P35 are executed between step P30 and step P40.

Step P15 corresponds to a pressure control step in which the control unit 10 controls the pressure control unit 90 to control the pressure in the through hole 47 of the flat screw 40 to be higher than a pressure in the communication hole 53 of the facing portion 50. The pressure in the communication hole 53 is controlled by the control unit 10 controlling the number of rotations of the flat screw 40. Step P15 is started before the generation of the plasticized material in step P20 is started, and is continued during the generation of the plasticized material in the plasticizing unit 35. In the pressure control step in step P15, the pressure in the through hole 47 is controlled to be high, the plasticized material collected in the central portion 45 of the flat screw 40 can be prevented from flowing into the conveying path 65 of the fiber material FB through the through hole 47. Therefore, in the steps described below, inhibition of the introduction of the fiber material FB into the plasticized material can be prevented.

Step P33 corresponds to the covering step in step P5 described in the second embodiment. In step P33, the fiber material FB sent from the accommodation unit 63 of the fiber introducing unit 23 to the conveying path 65 is covered with the covering material CM when passing through the storage portion 68.

In the fifth embodiment, step P35 and step P40 correspond to the discharging step. In step P35, the fiber material FB, which is the covered fiber material covered with the covering material CM, is introduced into the plasticized material before being discharged from the nozzle opening 28. In step P35, the fiber material FB is introduced into the plasticized material collected in the central portion 45 of the flat screw 40 through the through hole 47 of the flat screw 40. In step P40, the plasticized material into which the fiber material FB is introduced in step P35 is discharged from the nozzle opening 28.

According to the shaping apparatus 100d according to the fifth embodiment, the fiber material FB can be smoothly introduced into the communication hole 53 of the facing portion 50 through the through hole 47 of the flat screw 40. Since the pressure in the through hole 47 of the flat screw 40 is controlled to be higher than the pressure in the communication hole 53 of the facing portion 50 by the pressure control portion 90, the plasticized material of the central portion 45 can be prevented from flowing into the through hole 47.

6 Sixth Embodiment

Figure 13:
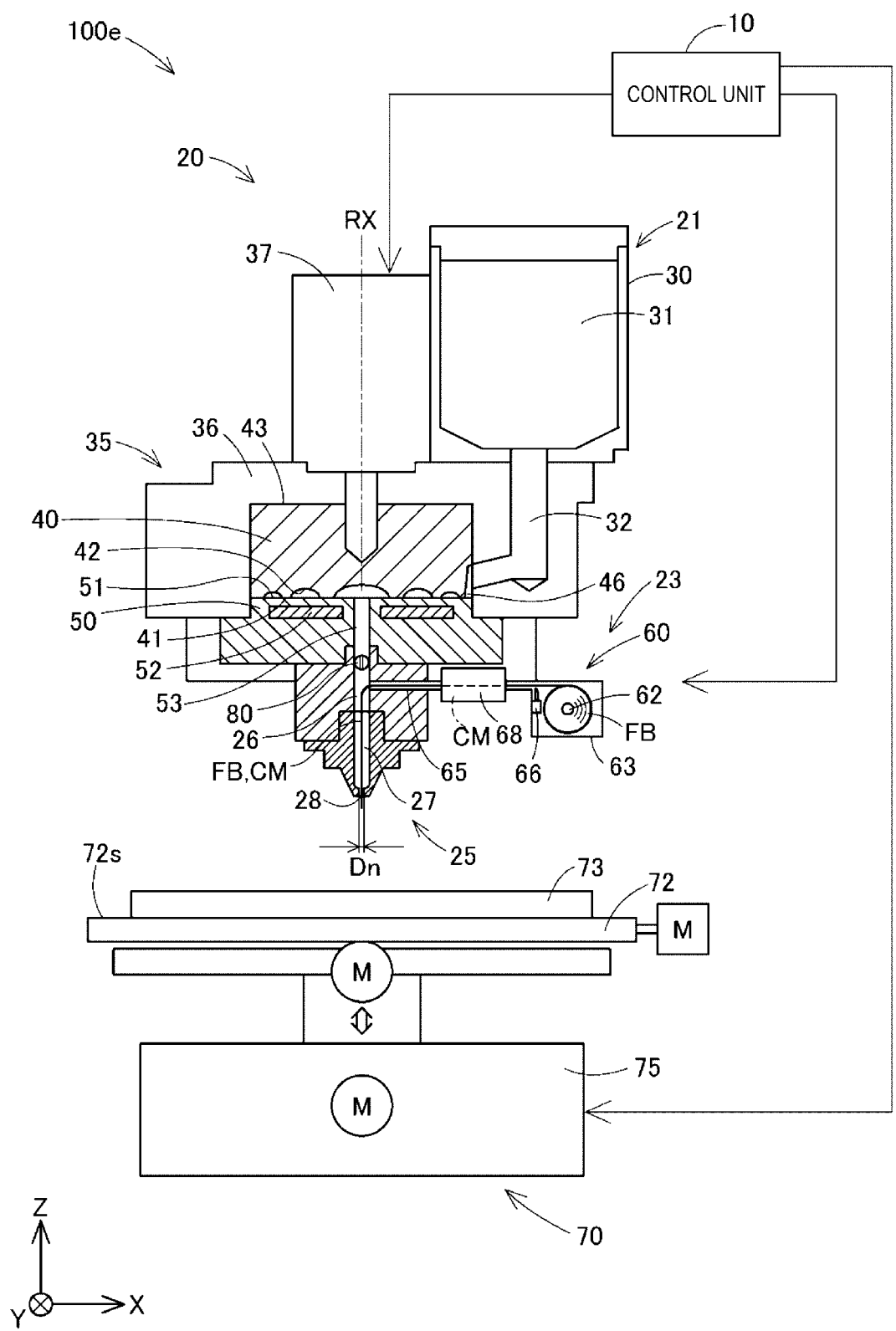
FIG. 13 is a schematic diagram showing a configuration of a three-dimensional shaping apparatus according to a sixth embodiment.

FIG. 13 is a schematic diagram showing a configuration of a shaping apparatus 100e according to a sixth embodiment. The shaping apparatus 100e according to the sixth embodiment has substantially the same configuration as the shaping apparatus 100b according to the second embodiment except for the following matters. In the shaping apparatus 100e according to the sixth embodiment, the introduction groove 57 of the facing portion 50 is omitted, and the conveying path 65 of the fiber introducing unit 23 is coupled to the introduction flow path 26 of the nozzle unit 25. The conveying path 65 is coupled to downstream of the discharge amount control mechanism 80. The cutting unit 66 is provided in the accommodation unit 63 and is provided near an entrance of the conveying path 65. According to the shaping apparatus 100e, the fiber material FB covered with the covering material CM can be introduced into the plasticized material that is supplied from the plasticizing unit 35 to the nozzle unit 25 and before being discharged from the nozzle opening 28. According to the configuration according to the sixth embodiment, it is also possible to prevent the mixing of air bubbles into the plasticized material due to the introduction of the fiber material FB, as in the above embodiments. The conveying path 65 of the fiber introducing unit 23 may be coupled to the nozzle flow path 27 instead of the introduction flow path 26.

7 Seventh Embodiment

Figure 14:
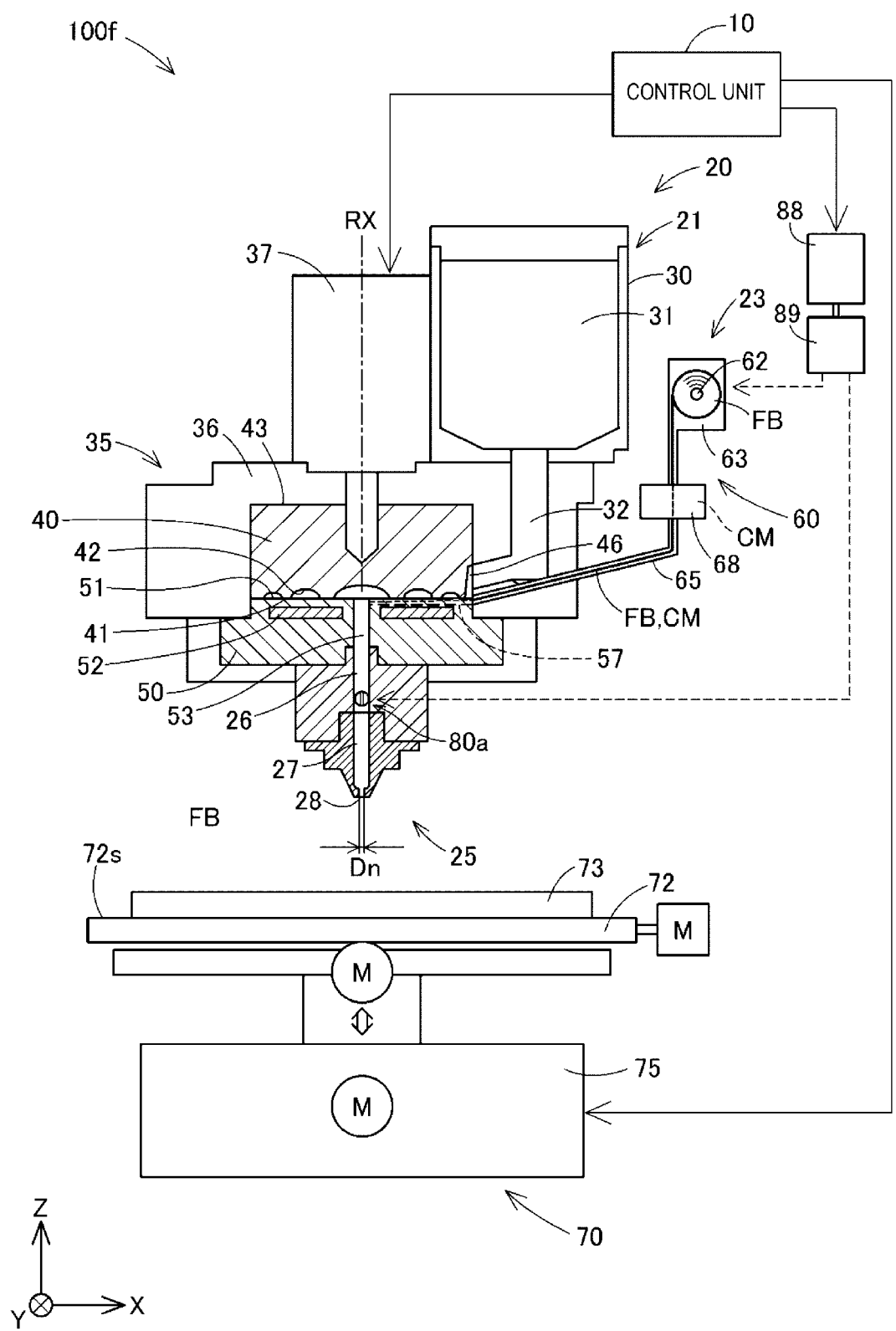
FIG. 14 is a schematic diagram showing a configuration of a three-dimensional shaping apparatus according to a seventh embodiment.

FIG. 14 is a schematic diagram showing a configuration of a shaping apparatus 100f according to a seventh embodiment. The shaping apparatus 100f according to the seventh embodiment has substantially the same configuration as the shaping apparatus 100b according to the second embodiment except for the following matters. In the shaping apparatus 100f according to the seventh embodiment, the cutting unit 66 of the fiber introducing unit 23 is omitted. In the shaping apparatus 100f, instead of the discharge amount control mechanism 80, a discharge amount control mechanism 80a according to the seventh embodiment is provided in the introduction flow path 26. As will be described later, the discharge amount control mechanism 80a according to the seventh embodiment has a function as a cutting unit that cuts the fiber material FB in addition to a function of controlling the discharge amount of the plasticized material from the nozzle opening 28. The shaping apparatus 100f further includes a motor 88 that generates a driving force, and a gear unit 89 that switches a transmission destination of the driving force of the motor 88 to the discharge amount control mechanism 80a or the conveying unit 60 of the fiber introducing unit 23. The motor 88 is configured by, for example, a stepping motor. The switching of the transmission destination of the driving force of the motor 88 by the control unit 10 will be described later.

Figure 15:
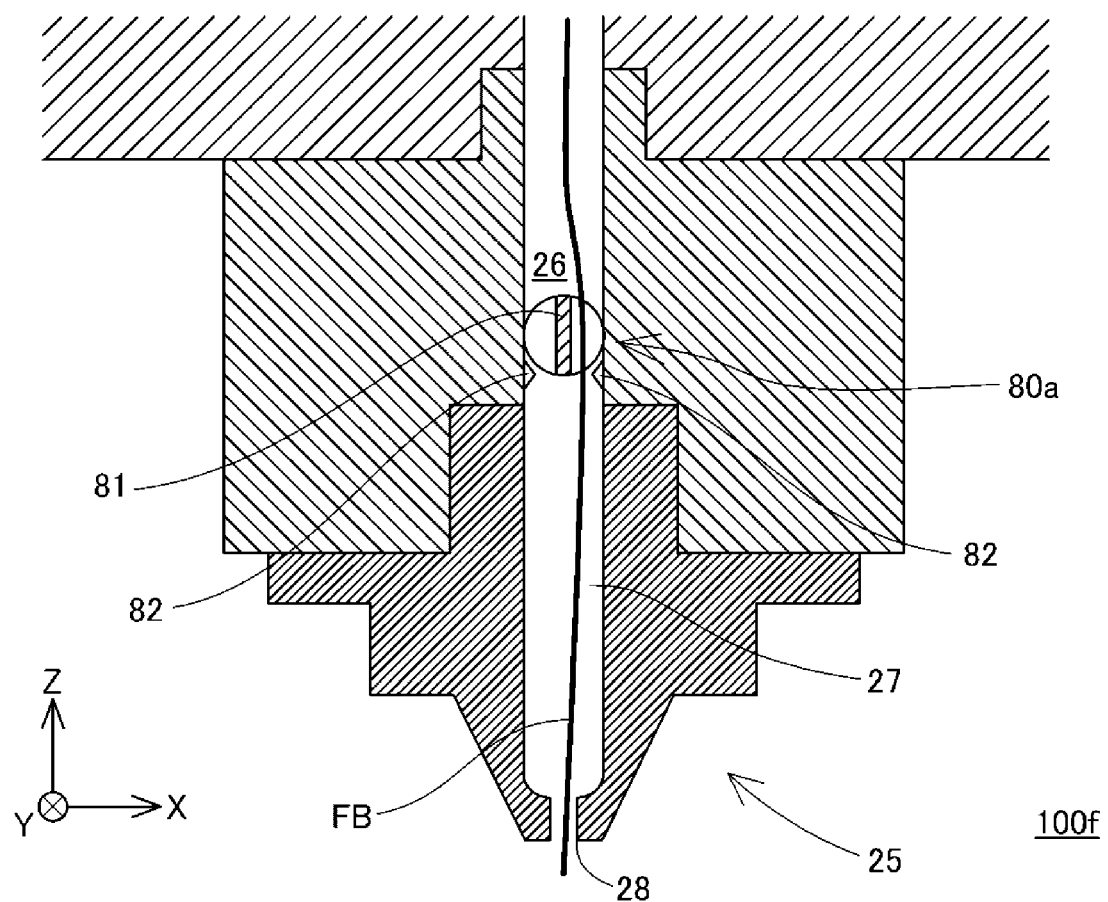
FIG. 15 is a schematic diagram showing a configuration of a discharge amount control mechanism according to the seventh embodiment.

FIG. 15 is a schematic diagram showing a configuration of the discharge amount control mechanism 80a according to the seventh embodiment. FIG. 15 schematically shows a state in which the discharge amount control mechanism 80a opens a flow path and the fiber material FB passes through the opened flow path. The discharge amount control mechanism 80a includes a butterfly valve 81, which is a valve element that rotates in the introduction flow path 26, and a cutter blade 82 provided around the butterfly valve 81. The butterfly valve 81 is rotated by the driving force of the motor 88 shown in FIG. 14, and changes the opening area of the introduction flow path 26 according to a rotation angle of the butterfly valve 81. The control unit 10 controls the discharge amount of the plasticized material from the nozzle opening 28 based on the rotation angle of the butterfly valve 81. The cutter blade 82 is provided at a position close to a rotation area of the butterfly valve 81.

Figure 16:
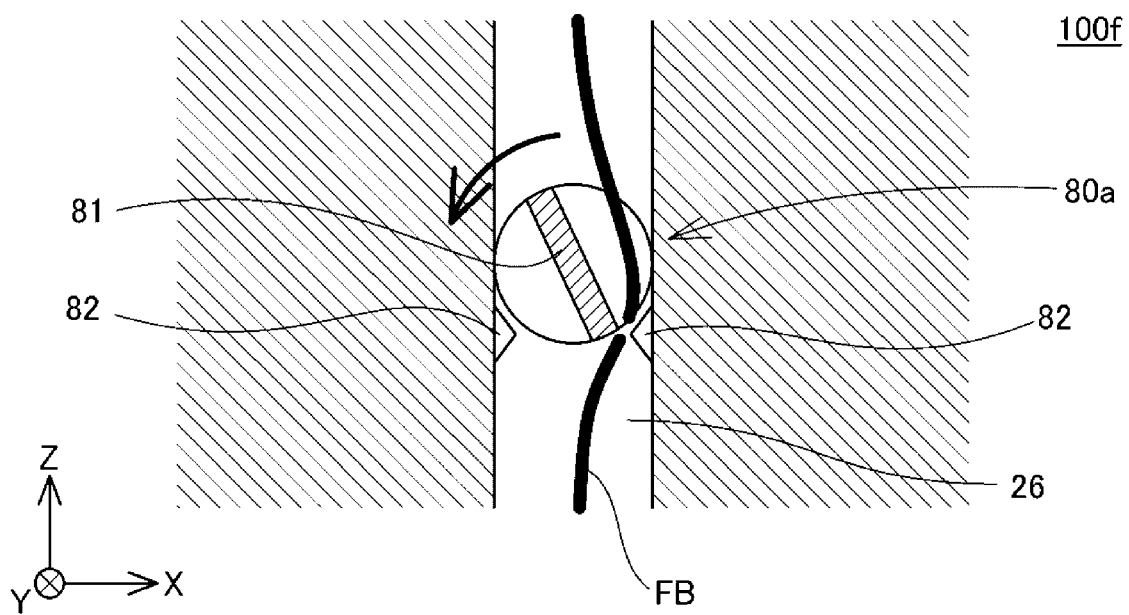
FIG. 16 is a schematic diagram showing a mechanism in which the discharge amount control mechanism according to the seventh embodiment cuts the fiber material.

FIG. 16 is a schematic diagram illustrating a mechanism in which the discharge amount control mechanism 80a cuts the fiber material FB. FIG. 16 schematically shows how the butterfly valve 81 of the discharge amount control mechanism 80a rotates to cut the fiber material FB from the state shown in FIG. 15. When the control unit 10 rotates the butterfly valve 81 to close the introduction flow path 26, the fiber material FB is sandwiched between an end portion of the butterfly valve 81 during rotation and the cutter blade 82, and is pressed against and cut by the cutter blade 82. After the fiber material FB is cut, the butterfly valve 81 continues to rotate and closes the introduction flow path 26.

The shaping apparatus 100f according to the seventh embodiment executes shaping processing by the steps shown in FIG. 8 described in the second embodiment. In the shaping processing, the control unit 10 controls the motor 88 to drive and controls the gear unit 89 to switch the transmission destination of the driving force generated by the motor 88. When the fiber material FB is introduced in the fiber introducing step in step P10, the control unit 10 transmits the driving force generated by the motor 88 to the conveying unit 60 with the gear unit 89 and uses the driving force to convey the fiber material FB.

When starting the discharge of the plasticized material from the nozzle opening 28 in step P40, in order to adjust the discharge amount, the control unit 10 temporarily switches the transmission destination of the driving force generated by the motor 88 to the discharge amount control mechanism 80a with the gear unit 89. Accordingly, the butterfly valve 81 of the discharge amount control mechanism 80a can be rotated by the driving force generated by the motor 88, and the discharge amount of the plasticized material can be controlled.

In step P50, when stopping the discharge of the plasticized material, the control unit 10 switches the transmission destination of the driving force generated by the motor 88 from the conveying unit 60 to the discharge amount control mechanism 80a, and rotates the butterfly valve 81. Accordingly, the fiber material FB is cut, and the discharge of the plasticized material from the nozzle openings 28 is stopped. As described above, step P50 includes a cutting step of cutting the fiber material FB, which is the covered fiber material, by operating the discharge amount control mechanism 80a.

According to the shaping apparatus 100f according to the seventh embodiment, since the conveying unit 60 of the fiber introducing unit 23 and the discharge amount control mechanism 80a can be driven by the common motor 88, a size of the apparatus configuration can be reduced. According to the shaping apparatus 100f according to the seventh embodiment, since the discharge amount control mechanism 80a can stop the discharge of the plasticized material at the same time as cutting the fiber material FB, controllability of the discharge of the shaping material from the nozzle opening 28 is further improved.

8 Eighth Embodiment

Figure 17:
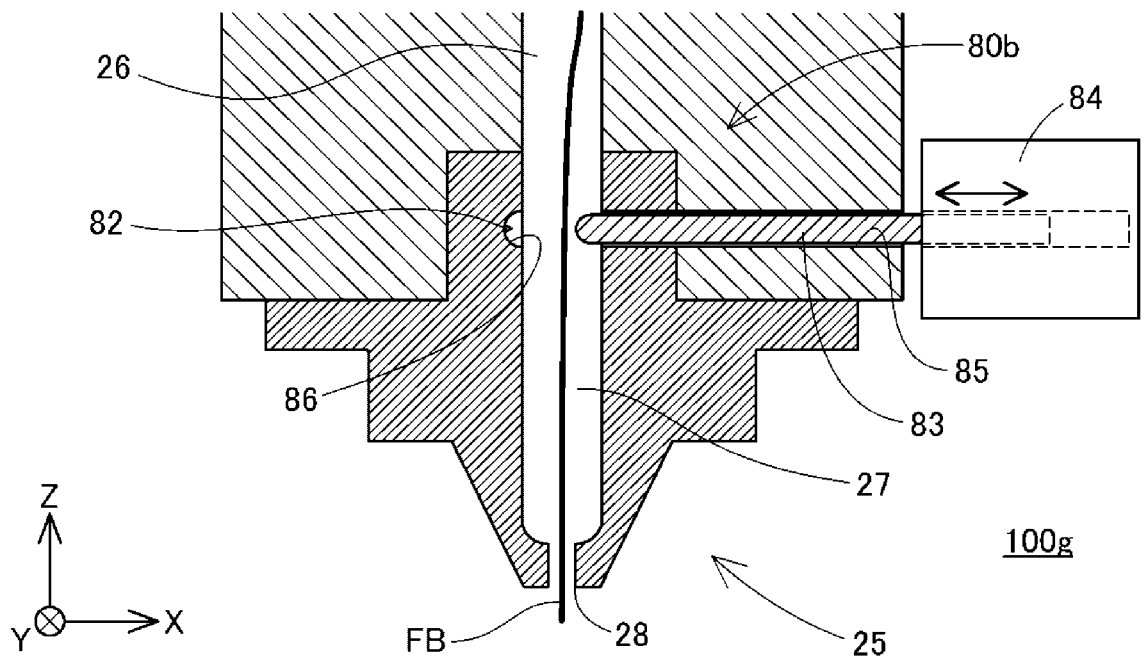
FIG. 17 is a schematic diagram showing a configuration of a discharge amount control mechanism according to an eighth embodiment.

FIG. 17 is a schematic diagram showing a configuration of a discharge amount control mechanism 80b included in a shaping apparatus 100g according to an eighth embodiment. FIG. 17 schematically shows a state in which a rod 83 of the discharge amount control mechanism 80b is positioned at an initial position, which will be described later, and the fiber material FB is being send to the nozzle flow path 27.

The shaping apparatus 100g according to the eighth embodiment has substantially the same configuration as the shaping apparatus 100f according to the seventh embodiment except for the following matters. The shaping apparatus 100g includes the discharge amount control mechanism 80b having a configuration different from that of the discharge amount control mechanism 80a described in the seventh embodiment. The discharge amount control mechanism 80b according to the eighth embodiment is provided in the nozzle flow path 27. The discharge amount control mechanism 80b realizes, by moving the rod 83 in a direction intersecting the nozzle flow path 27 by a plunger mechanism, a function of controlling the discharge amount of the plasticized material and a function of cutting the fiber material FB. The shaping apparatus 100g, which is not shown, has a butterfly valve similar to the discharge amount control mechanism 80 described in the first embodiment upstream of the discharge amount control mechanism 80b, and can stop a discharge of the plasticized material from the nozzle opening 28 by opening and closing the butterfly valve.

The discharge amount control mechanism 80b includes the rod 83 that performs a piston motion in the direction intersecting the nozzle flow path 27, a drive mechanism 84 that drives the rod 83, a recessed portion 86 formed at the internal wall surface of the nozzle flow path 27, and the cutter blade 82 provided in the recessed portion 86. The rod 83 moves in a branch flow path 85 that is coupled to the nozzle flow path 27. Similarly to the discharge amount control mechanism 80a according to the seventh embodiment, the discharge amount control mechanism 80b according to the eighth embodiment receives a driving force of the rod 83 from the motor 88 common to the conveying unit 60 shown in FIG. 14. The drive mechanism 84 instantaneously moves the rod 83 by converting a rotational motion generated by the motor 88 into a linear motion.

First, a mechanism for controlling the discharge amount of the plasticized material by the discharge amount control mechanism 80b will be described. When the rod 83 is instantaneously moved to a deep position deep in the branch flow path 85, the plasticized material is drawn into the branch flow path 85 in accordance with the movement of the rod 83. Thus, a negative pressure is generated in the nozzle flow path 27, and the plasticized material discharged from the nozzle opening 27 is pulled back to the nozzle flow path 27, so that the discharge of the plasticized material from the nozzle opening 28 can be temporarily stopped. In contrast, when the rod 83 is moved from the deep position in the branch flow path 85 toward the nozzle flow path 27, the plasticized material in the branch flow path 85 is extruded into the nozzle flow path 27, and the discharge amount of the plasticized material can be temporarily increased. Thus, the discharge amount control mechanism 80b can control the discharge amount of the plasticized material from the nozzle opening 28 by the movement of the rod 83.

Next, a mechanism for cutting the fiber material FB by the discharge amount control mechanism 80b will be described. The rod 83 can be instantaneously moved to protrude from the branch flow path 85 into the nozzle flow path 27. A tip of the rod 83 that is protruded into the nozzle flow path 27 is received by the recessed portion 86. The fiber material FB is cut by a movement of the rod 83 of protruding toward the recessed portion 86 as described below.

Figure 18:
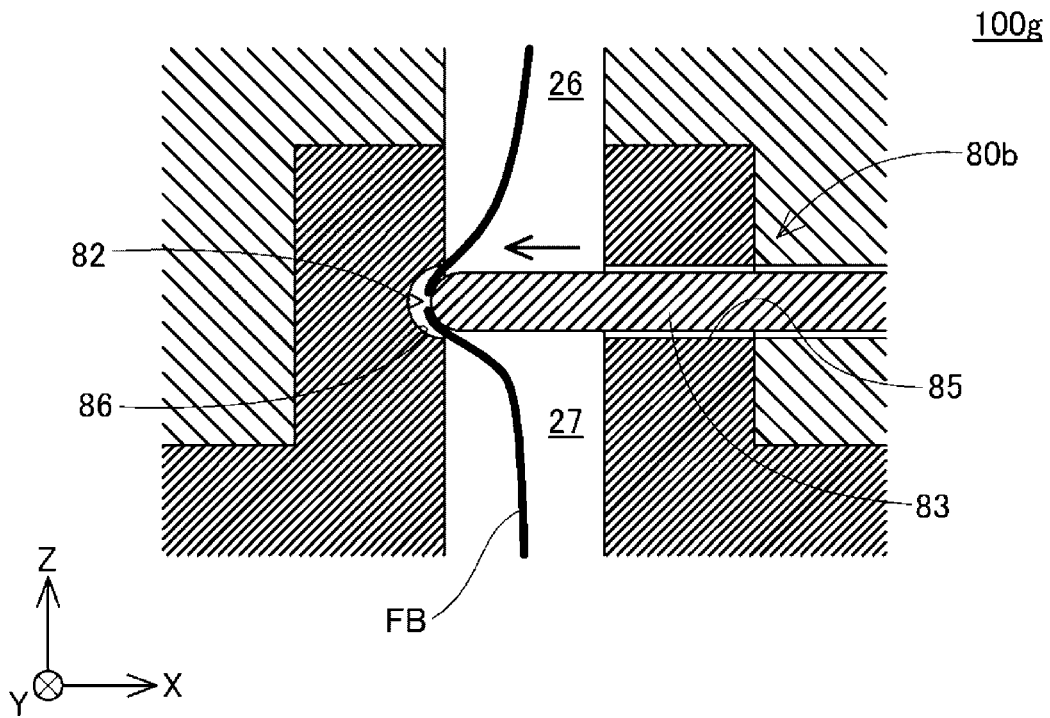
FIG. 18 is a schematic diagram showing a mechanism in which the discharge amount control mechanism according to the eighth embodiment cuts the fiber material.

FIG. 18 is a schematic diagram illustrating a mechanism in which the discharge amount control mechanism 80b according to the eighth embodiment cuts the fiber material FB. FIG. 18 schematically shows how the rod 83 of the discharge amount control mechanism 80b is moved, from the state shown in FIG. 17, in a direction in which the rod 83 protrudes into the nozzle flow path 27 to cut the fiber material FB. As described above, the cutter blade 82 is provided in the recessed portion 86 that receives the tip of the rod 83. When the rod 83 is instantaneously moved toward the recessed portion 86, the fiber material FB is sandwiched between the tip of the rod 83 and the cutter blade 82 in the recessed portion 86, and is pressed against and cut by the cutter blade 82.

When the butterfly valve provided upstream of the control unit 10 is closed to stop the discharge of the plasticized material from the nozzle opening 28 or when the butterfly valve is opened to restart the discharge of the plasticized material, the control unit 10 of the shaping apparatus 100g drives the discharge amount control mechanism 80b as described below. While the plasticized material is discharged from the nozzle opening 28, the rod 83 of the discharge amount control mechanism 80b is located at a position where the tip of the rod 83 closes an outlet of the branch flow path 85 as shown in FIG. 17. Hereinafter, this position is also referred to as an "initial position".

When the butterfly valve is closed, the control unit 10 drives the discharge amount control mechanism 80b to instantaneously move the rod 83 toward the recessed portion 86 to protrude from the initial position to the nozzle flow path 27, thereby cutting the fiber material FB. Thereafter, the negative pressure is generated in the nozzle flow path 27 by instantaneously moving the rod 83 to the deep position in the branch flow path 85 without leaving a gap therebetween. Accordingly, the plasticized material flowing out from the nozzle opening 28 is pulled back to the nozzle flow path 27, so that the excessive plasticized material can be prevented from dripping from the nozzle opening 28 in a string-like manner after the discharge of the plasticized material is stopped.

When the butterfly valve is opened to restart the discharge of the plasticized material, the control unit 10 returns the rod 83 that is located at the deep position in the branch flow path 85 to the initial position, thereby returning the plasticized material that is drawn into the branch flow path 85 to the nozzle flow path 27. Accordingly, the discharge amount of the plasticized material can be temporarily increased when the discharge of the plasticized material from the nozzle opening 28 is restarted. Therefore, the restart of the discharge of the plasticized material can be prevented from being delayed due to an insufficient amount of the plasticized material supplied to the nozzle flow path 27 when the discharge of the plasticized material is restarted.

Thus, according to the discharge amount control mechanism 80b, when the discharge of the plasticized material from the nozzle opening 28 is stopped, an outflow of the plasticized material from the nozzle opening 28 can be quickly stopped while cutting the fiber material FB. When the discharge of the plasticized material from the nozzle opening 28 is restarted, the plasticized material in the branch flow path 85 is extruded by the rod 83, and the discharge amount of the plasticized material from the nozzle opening 28 can be rapidly returned to a target value. That is, according to the discharge amount control mechanism 80b, a higher responsiveness of the discharging unit 20 with respect to the discharge control of the plasticized material by the control unit 10 can be attained.

As described above, according to the shaping apparatus 100g according to the eighth embodiment, similarly to the shaping apparatus 100f according to the seventh embodiment, since the conveying unit 60 and the discharge amount control mechanism 80b are driven by the common motor 88, a size of the apparatus configuration can be reduced. Further, with the discharge amount control mechanism 80b, the controllability of the discharge of the plasticized material containing the fiber material FB from the nozzle opening 28 can be further improved.

9 Ninth Embodiment

Figure 19:
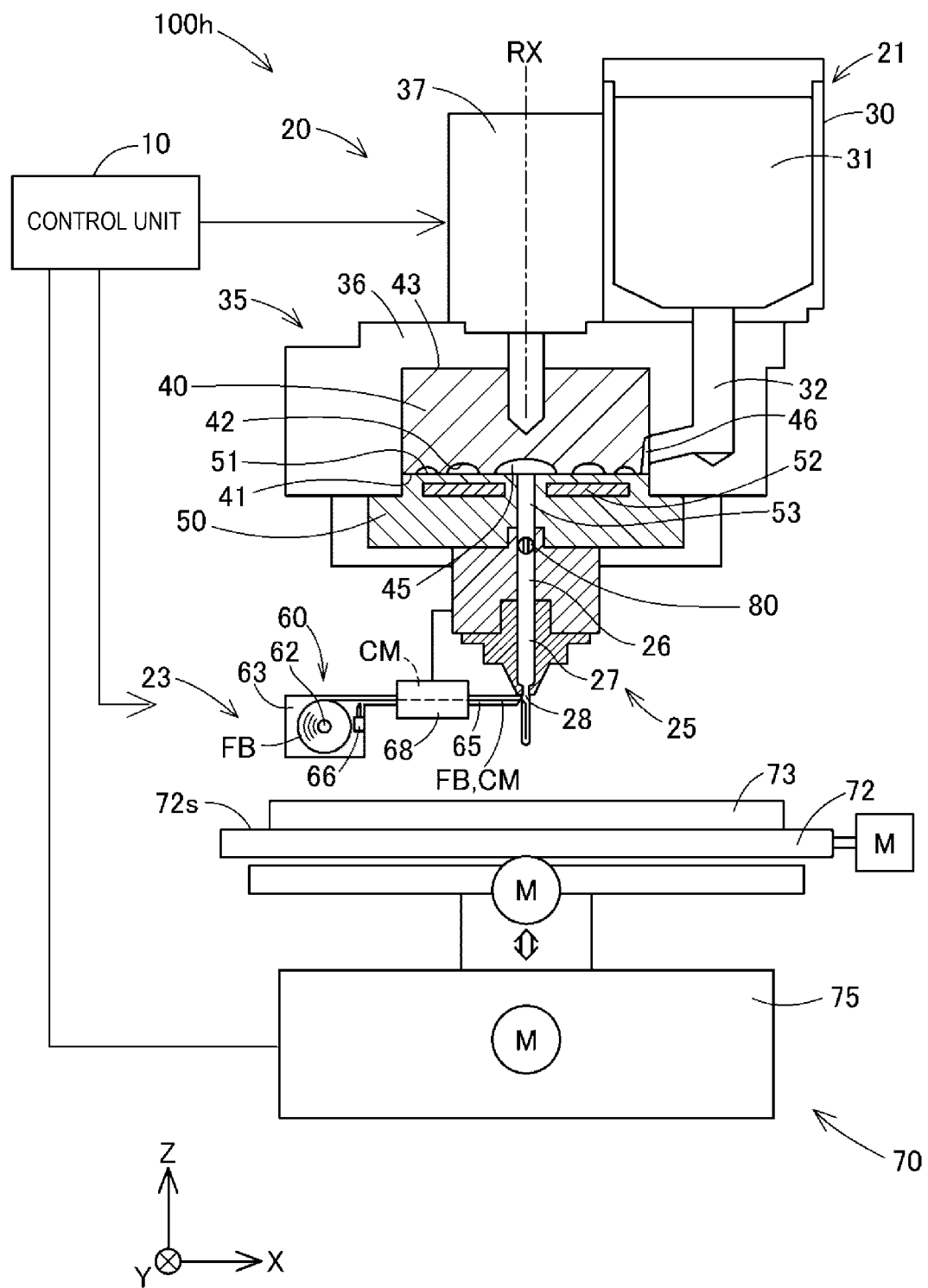
FIG. 19 is a schematic diagram showing a configuration of a three-dimensional shaping apparatus according to a ninth embodiment.

FIG. 19 is a schematic diagram showing a configuration of a shaping apparatus 100h according to a ninth embodiment. The shaping apparatus 100h according to the ninth embodiment has substantially the same configuration as the shaping apparatus 100b according to the second embodiment shown in FIG. 7 except for the following matters. In the shaping apparatus 100h according to the ninth embodiment, the conveying path 65 of the fiber introducing unit 23 is coupled to downstream of the nozzle opening 28. The fiber introducing unit 23 is fixed to the nozzle unit 25 so as to be relatively movable with respect to the stage 72 and the nozzle unit 25. In the shaping apparatus 100h, the fiber introducing unit 23 has a function of introducing the fiber material FB, which is the covered fiber material, into the plasticized material after being discharged from the nozzle opening 28.

Figure 20:
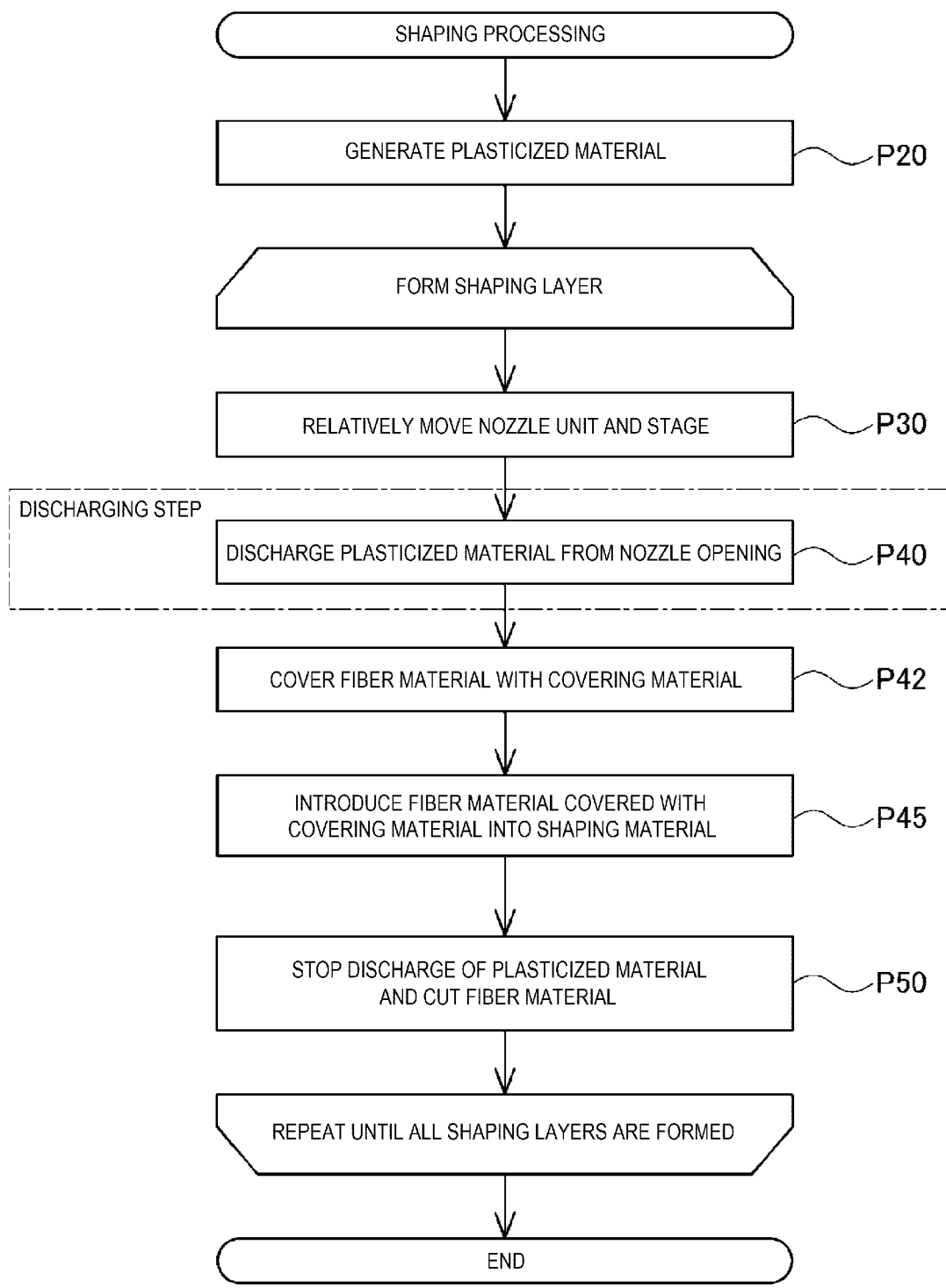
FIG. 20 is a flowchart showing steps executed in shaping processing according to the ninth embodiment.

FIG. 20 is a flowchart showing steps executed by the shaping apparatus 100h in shaping processing according to the ninth embodiment. FIG. 20 is substantially the same as the shaping processing shown in FIG. 8 described in the second embodiment except that instead of step P5 and step P10, step P42 and step P45 that correspond to step P5 and step P10 are provided between step P40 and step P50. Step P42 is a step of covering the fiber material FB with the covering material CM by passing the fiber material FB through the storage portion 68 in which the covering material CM is stored. Step P45 corresponds to the fiber introducing step of introducing the fiber material FB, which is the covered fiber material covered with the covering material CM, into the plasticized material after being discharged from the nozzle opening 28 in the discharging step in step P40.

According to the shaping apparatus 100h according to the ninth embodiment, the fiber introducing unit 23 can be easily provided by retrofitting. In the shaping apparatus 100h according to the ninth embodiment, since the fiber material FBb does not pass through the nozzle opening 28, the fiber diameter of the fiber material FB can be made larger than the hole diameter Dn of the nozzle opening 28. In the ninth embodiment, the fiber diameter of the fiber material FBb may be, for example, from 10 μm to 500 μm.

10 Other Embodiments

The various configurations described in the above embodiments can be modified, for example, as follows. Each of other embodiments described below is positioned as an example of a mode for implementing the present disclosure, similarly to each of the above embodiments.

10-1 Another Embodiment 1

In each of the embodiments other than the above first embodiment, the storage portion 68 may be omitted, and the fiber material FB that is covered with the covering material CM in advance may be used as in the first embodiment. In the first embodiment, the fiber introducing unit 23 may be omitted, and the fiber material FB that is covered with the covering material CM in advance may be finely divided and introduced into the shaping material of the material accommodation unit 31. The fiber material FB that is covered with the covering material CM and that is finely divided may be mixed into the pellets to be supplied to the material accommodation unit 31.

10-2 Another Embodiment 2

In each of the above embodiments, in addition to the fiber material FB, a second fiber material different from the fiber material FB may be introduced into the shaping material or the plasticized material. The second fiber material may be introduced into the shaping material or the plasticized material by a second fiber introducing unit having the same configuration as the fiber introducing unit 23 of the fiber material FB described in each of the above embodiments. The second fiber material may be a fiber material having a fiber diameter different from that of the fiber material FB serving as a first fiber material, or may be a fiber material having a length different from that of the fiber material FB serving as the first fiber material. The second fiber material may be composed of a different type of fiber from the fiber material FB serving as the first fiber material. The second fiber material may be covered with the covering material CM in advance, and may be introduced into the shaping material of the material accommodation unit 31 in a finely divided state. In addition, the second fiber material may be mixed into the pellets to be supplied to the material accommodation unit 31 in a state in which the second fiber material is covered with the covering material CM and is finely divided.

10-3 Another Embodiment 3

In each of the above embodiments, instead of plasticizing the thermoplastic resin with the flat screw 40 to generate the plasticized material, the plasticized material may be generated by another method. For example, the plasticized material may be generated with an in-line screw.

10-4 Another Embodiment 4

In the above third embodiment, the introduction groove 57 for introducing the fiber material FB may be formed in the flat screw 40 separately from the groove portion 42 that functions as the flow path of the plasticized material.

10-5 Another Embodiment 5

In the above fifth embodiment, the pressure control unit 90 may be omitted. In this case, in order to prevent the plasticized material from flowing into the conveying path 65 of the fiber material FB from the flat screw 40, for example, a portion where a gap between the through hole 47 and the fiber material FB becomes small may be locally provided, or a check valve structure for preventing the plasticized material from flowing into the conveying path 65 may be provided. The check valve structure may be configured by, for example, an annular packing.

10-6 Another Embodiment 6

In the above ninth embodiment, the fiber introducing unit 23 may not be fixed to the nozzle unit 25. The fiber introducing unit 23 may be configured by, for example, a robot that embeds the fiber material FB covered with the covering material CM in the plasticized material discharged to the stage 72 under the control of the control unit 10.

10-7 Another Embodiment 7

The configurations described in the above embodiments can be appropriately extracted and combined. For example, in the shaping apparatus, in addition to the configuration according to the first embodiment or the second embodiment in which the fiber material FB is introduced into the shaping material, the configuration according to the ninth embodiment in which the fiber material FB is introduced into the plasticized material after being discharged from the nozzle opening 28 may be combined. Alternatively, in addition to the configuration according to the fifth embodiment or the sixth embodiment in which the fiber material FB is introduced into the plasticized material before being discharged from the nozzle opening 28, the configuration according to the ninth embodiment in which the fiber material FB is introduced into the plasticized material after being discharged from the nozzle opening 28 may be combined. The fiber introduction control step in step P35 shown in FIG. 10 according to the fourth embodiment may be applied to each of the above embodiments other than the fourth embodiment. The pressure control unit 90 according to the fifth embodiment may be applied to the conveying unit 60 according to each of the above embodiments. In this case, the pressure control unit 90 may control a pressure in the conveying path 65 to be higher than a pressure in the flow path of the plasticized material. The configuration in which the transmission destination of the driving force of the motor 88 is switched by the gear unit 89 according to the above seventh embodiment or the above eighth embodiment, and the discharge amount control mechanisms 80a and 80b having the function of cutting the fiber material FB may be applied to the embodiments other than the seventh embodiment and the eighth embodiment.

10-8 Another Embodiment 8

The discharge amount control mechanism 80b according to the above eighth embodiment may include, instead of the rod 83, a shutter valve capable of closing the nozzle flow path 27. In this case, the shutter valve is moved toward the recessed portion 86 by the drive mechanism 84 and received by the recessed portion 86, so that the nozzle flow path 27 can be closed to stop the discharge of the plasticized material from the nozzle opening 28 while cutting the fiber material FB.

10-9 Another Embodiment 9

In each of the above embodiments, a method for manufacturing a three-dimensional shaped object including the following steps may be applied. The method for manufacturing a three-dimensional shaped object is executed by a three-dimensional shaping apparatus that manufactures a three-dimensional shaped object by laminating a shaping layer. The method includes a selection step of selecting a fiber material corresponding to a thickness of the shaping layer from a plurality of types of fiber materials having different fiber diameters, and a shaping step of forming the shaping layer by discharging a shaping material that includes the fiber material selected in the selection step from a nozzle opening. According to the manufacturing method according to this aspect, the three-dimensional shaping apparatus selects fiber materials having appropriate fiber diameters according to a thickness of the shaping layer from the plurality of types of fiber materials, and introduces the selected fiber materials into the shaping layer. Therefore, the shaping layer includes the fiber materials having appropriate fiber diameters, and strength of the three-dimensional shaped object can be enhanced. A decrease in productivity of the three-dimensional shaped object due to times and efforts required for replacing and loading the fiber materials having different fiber diameters to the three-dimensional shaping apparatus can be prevented.

10-10 Another Embodiment 10

In each of the above embodiments, a method for manufacturing a three-dimensional shaped object including the following steps may be applied. The method for manufacturing a three-dimensional shaped object includes: a plasticizing step of plasticizing at least a part of a shaping material containing a first fiber material and a thermoplastic resin to generate a plasticized material that is to be discharged from a nozzle opening so as to shape a three-dimensional shaped object; a fiber introducing step including either a step of introducing a second fiber material longer than the first fiber material into the shaping material or the plasticized material before being discharged from the nozzle opening, or a step of introducing the second fiber material into the plasticized material after being discharged from the nozzle opening; and a shaping step of shaping the three-dimensional shaped object containing the first fiber material and the second fiber material. According to this manufacturing method, the first fiber material and the second fiber material having different lengths can be combined and mixed in the three-dimensional shaped object so that strengths of the first fiber material and the second fiber material in various directions are mutually reinforced. Therefore, strength of the three-dimensional shaped object in various directions can be easily improved.

11 Overview (1) A method for manufacturing a three-dimensional shaped object according to an aspect of the present disclosure includes: a plasticizing step of plasticizing at least a part of a shaping material containing a thermoplastic resin to generate a plasticized material; a fiber introducing step including at least one of a step of introducing a covered fiber material, which is a fiber material covered with a covering material, into the plasticized material after being discharged from a nozzle opening, and a step of introducing the covered fiber material into the shaping material or the plasticized material before being discharged from the nozzle opening; and a shaping step of shaping a three-dimensional shaped object that includes the covered fiber material. According to this manufacturing method, in the fiber introducing step, the covering material that covers a surface of the covered fiber material can prevent air bubbles from adhering to a surface of the fiber material and mixing into the plasticized material. Therefore, a decrease in strength of the three-dimensional shaped object due to the mixing of the air bubbles into the plasticized material can be prevented.

(2) In the manufacturing method according to the above aspect, an absolute value of a difference between an SP value of the thermoplastic resin and an SP value of the covering material may be 5.0 or less. According to the manufacturing method according to this aspect, affinity between the thermoplastic resin and the covering material can be increased, and the covered fiber material and the plasticized material can be more compatible with each other. Therefore, the decrease in strength of the three-dimensional shaped object due to the mixing of the air bubbles into the plasticized material can be further prevented when introducing the covered fiber material.

(3) In the manufacturing method according to the above aspect, the covering material may contain a thermoplastic resin of the same type as the thermoplastic resin contained in the plasticized material. According to the manufacturing method according to this aspect, since the thermoplastic resin and the covering material are the same type of material, the plasticized material is more compatible with the surface of the covered fiber material. Therefore, the decrease in strength of the three-dimensional shaped object due to the mixing of the air bubbles into the plasticized material can be further prevented when introducing the covered fiber material.

(4) The manufacturing method according to the above aspect may further include a covering step of, before the fiber introducing step, generating the covered fiber material by passing the fiber material through a storage portion in which the covering material is stored. According to the manufacturing method according to this aspect, the surface of the fiber material can be easily covered with the covering material.

(5) In the manufacturing method according to the above aspect, the plasticizing step may include, in a plasticizing apparatus that includes a flat screw that has a groove forming surface in which a groove portion is formed, a facing portion that has a facing surface facing the groove forming surface and that is formed with a communication hole communicating with the nozzle opening, and a heater that is configured to heat the flat screw or the facing portion, a step of guiding at least a part of the thermoplastic resin supplied between the flat screw and the facing portion to the communication hole while plasticizing the thermoplastic resin by rotation of the flat screw and heating of the heater. According to the manufacturing method according to this aspect, a size of an apparatus for executing the plasticizing step can be reduced with the flat screw in the plasticizing step. Further, since the control of the pressure and the flow rate of the plasticized material supplied to the nozzle opening is facilitated by the rotation control of the flat screw, accuracy of discharging the plasticized material can be increased, and accuracy of shaping the three-dimensional shaped object can be increased.

(6) In the manufacturing method according to the above aspect, the groove forming surface or the facing surface may have an introduction groove that guides the fiber material from a side of the flat screw or the facing portion to the communication hole, and in the fiber introducing step, the covered fiber material may be introduced into the shaping material through the introduction groove. According to the manufacturing method according to this aspect, the plasticized material can be more compatible with the surface of the covered fiber material by using a pressure in the groove portion of the flat screw increasing toward the communication hole. Therefore, the air bubbles can be further prevented from being mixed into the plasticizing material when introducing the covered fiber material into the plasticized material.

(7) In the manufacturing method according to the above aspect, the flat screw may have a through hole that is opened in the groove forming surface and that communicates with the communication hole, and the fiber introducing step may include a step of introducing the covered fiber material into the plasticized material through the through hole. According to the manufacturing method according to this aspect, the covered fiber material can be smoothly introduced into the communication hole of the facing portion through the through hole of the flat screw.

(8) In the manufacturing method according to the above aspect, the fiber introducing step may include a pressure control step of controlling a pressure in the through hole to be higher than a pressure in the communication hole. According to the manufacturing method according to this aspect, since the pressure in the through hole is controlled to be high, it is possible to prevent the introduction of the covered fiber material from being hindered due to the flow of the plasticized material into the through hole.

(9) In the manufacturing method according to the above aspect, the shaping step may include a moving step of relatively moving a stage at which the three-dimensional shaped object is supported and a nozzle unit having the nozzle opening, and a fiber introduction control step of changing an introduction speed at which the covered fiber material is introduced into the shaping material or the plasticized material in accordance with a relative movement speed between the nozzle unit and the stage in the moving step. According to the method for manufacturing a three-dimensional shaped object according to this aspect, during the shaping of the three-dimensional shaped object, it is possible to prevent a change in an amount or a state of the fiber material contained into the discharged plasticized material due to a change in the relative movement speed between the nozzle opening and the stage. Accordingly, the fiber material can be introduced into the three-dimensional shaped object in a more stable state, and the strength of the three-dimensional shaped object can be further enhanced.

(10) The manufacturing method according to the above aspect may further include a cutting step of cutting the fiber material before or after the fiber introducing step. According to the manufacturing method according to this aspect, by cutting the fiber material, adjustment of a length of the fiber material to be introduced into the three-dimensional shaped object, control of stopping the introduction of the fiber material into the plasticized material, and the like can be easily executed.

(11) In the manufacturing method according to the above aspect, the cutting step may include a step of cutting the covered fiber material by operating a discharge amount control mechanism that is provided upstream of the nozzle opening and that is configured to control a discharge amount of the plasticized material. According to the manufacturing method according to this aspect, the discharge amount control mechanism can control the discharge amount of the plasticized material and the introduction of the covered fiber material into the plasticized material, which is efficient.

(12) In the method for manufacturing a three-dimensional shaped object according to the above aspect, the discharge amount control mechanism may be driven by a motor, and the fiber introducing step may include a step of transmitting a driving force generated by the motor to a conveying unit of the covered fiber material to convey the covered fiber material. According to the manufacturing method according to this aspect, since the conveying unit and the discharge amount control mechanism can be driven by the common motor, a size of the apparatus configuration can be reduced.

(13) A three-dimensional shaping apparatus according to another aspect of the present disclosure includes: a plasticizing unit configured to plasticize at least a part of a shaping material containing a thermoplastic resin to generate a plasticized material; a discharging unit having a nozzle opening; a fiber introducing unit having at least one of a function of introducing a covered fiber material, which is a fiber material covered with a covering material, into the plasticized material after being discharged from the nozzle opening, and a function of introducing the covered fiber material into the shaping material or the plasticized material before being discharged from the nozzle opening; and a control unit configured to control the plasticizing unit, the discharging unit, and the fiber introducing unit to shape a three-dimensional shaped object including the covered fiber material. According to the three-dimensional shaping apparatus according to this aspect, when the covered fiber material is introduced into the plasticized material, the covering material can prevent air bubbles from adhering to the surface of the covered fiber material and being mixed into the plasticized material. Therefore, the decrease in strength of the three-dimensional shaped object due to the mixing of the air bubbles into the plasticized material can be prevented.

What is claimed is:

1. A method for manufacturing a three-dimensional shaped object, comprising:
   a plasticizing step of plasticizing at least a part of a shaping material containing a thermoplastic resin to generate a plasticized material;
   a fiber introducing step including at least one of a step of introducing a covered fiber material, which is a first fiber material covered with a covering material, into the plasticized material after being discharged from a nozzle opening, and a step of introducing the covered fiber material into the shaping material or the plasticized material before being discharged from the nozzle opening;
   a cutting step of cutting the covered fiber material after the fiber introducing step, the cutting step including a step of cutting the covered fiber material by operating a discharge amount control mechanism, which is configured to control a discharge amount of the plasticized material from the nozzle opening, that is provided upstream of the nozzle opening to cut the covered fiber material disposed between the discharge amount control mechanism and a cutter blade provided in an introduction flow path that delivers the plasticized material to the nozzle opening; and
   a shaping step of shaping a three-dimensional shaped object including the covered fiber material,
   wherein the discharge amount control mechanism has a valve that rotates about an axis intersecting a direction in which the introduction flow path extends, and
   wherein in the cutting step, the covered fiber material is sandwiched and cut between the valve and the cutter blade by rotating the valve.

2. The method for manufacturing a three-dimensional shaped object according to claim 1, wherein
   an absolute value of a difference between an SP value of the thermoplastic resin and an SP value of the covering material is 5.0 or less.

3. The method for manufacturing a three-dimensional shaped object according to claim 1, wherein
   the covering material includes a thermoplastic resin of the same type as the thermoplastic resin contained in the plasticized material.

4. The method for manufacturing a three-dimensional shaped object according to claim 1, further comprising:
   a covering step of, before the fiber introducing step, generating the covered fiber material by passing the fiber material through a storage portion in which the covering material is stored.

5. A method for manufacturing a three-dimensional shaped object, comprising:
   a plasticizing step of plasticizing at least a part of a shaping material containing a thermoplastic resin to generate a plasticized material;
   a fiber introducing step including at least one of a step of introducing a covered fiber material, which is a first fiber material covered with a covering material, into the plasticized material after being discharged from a nozzle opening, and a step of introducing the covered fiber material into the shaping material or the plasticized material before being discharged from the nozzle opening;
   a cutting step of cutting the covered fiber material after the fiber introducing step, the cutting step including a step of cutting the covered fiber material by operating a discharge amount control mechanism, which is configured to control a discharge amount of the plasticized material from the nozzle opening, that is provided upstream of the nozzle opening to cut the covered fiber material disposed between the discharge amount control mechanism and a cutter blade provided in an introduction flow path that delivers the plasticized material to the nozzle opening; and
   a shaping step of shaping a three-dimensional shaped object including the covered fiber material,
   wherein the plasticizing step includes, in a plasticizing apparatus that includes a flat screw that has a groove forming surface in which a groove portion is formed, a facing portion that has a facing surface facing the groove forming surface and that is formed with a communication hole communicating with the nozzle opening, and a heater that is configured to heat the flat screw or the facing portion, a step of guiding at least a part of the thermoplastic resin supplied between the flat screw the facing portion to the communication hole while plasticizing the thermoplastic resin by rotation of the flat screw and heating of the heater.

6. The method for manufacturing a three-dimensional shaped object according to claim 5, wherein
   the groove forming surface or the facing surface has an introduction groove that is configured to guide the fiber material from a side of the flat screw or the facing portion to the communication hole, and
   in the fiber introducing step, the covered fiber material is introduced into the shaping material through the introduction groove.

7. The method for manufacturing a three-dimensional shaped object according to claim 5, wherein
   the flat screw has a through hole that is opened in the groove forming surface and that communicates with the communication hole, and
   the fiber introducing step includes a step of introducing the covered fiber material into the plasticized material through the through hole.

8. The method for manufacturing a three-dimensional shaped object according to claim 7, wherein
   the fiber introducing step includes a pressure control step of controlling a pressure in the through hole to be higher than a pressure in the communication hole.

9. The method for manufacturing a three-dimensional shaped object according to claim 1, wherein
   the shaping step includes:
   a moving step of relatively moving a stage at which the three-dimensional shaped object is supported and a nozzle unit having the nozzle opening; and a fiber introduction control step of changing an introduction speed at which the covered fiber material is introduced into the shaping material or the plasticized material in accordance with a relative movement speed between the nozzle unit and the stage in the moving step.

10. The method for manufacturing a three-dimensional shaped object according to claim 1, wherein
the discharge amount control mechanism is driven by a motor, and
the fiber introducing step includes a step of transmitting a driving force generated by the motor to a conveying unit of the covered fiber material to convey the covered fiber material.

11. A three-dimensional shaping apparatus, comprising:
a plasticizing unit configured to plasticize at least a part of a shaping material containing a thermoplastic resin to generate a plasticized material;
a discharging unit having a nozzle opening;
a fiber introducing unit having at least one of a function of introducing a covered fiber material, which is a fiber material covered with a covering material, into the plasticized material after being discharged from the nozzle opening, and a function of introducing the covered fiber material into the shaping material or the plasticized material before being discharged from the nozzle opening;
a discharge control mechanism configured to control a discharge amount of the plasticized material from the nozzle opening, the discharge control mechanism being provided upstream of the nozzle opening;
a cutter blade cooperating with the discharge control mechanism to cut the covered fiber material disposed between the discharge amount control mechanism and the cutter blade, the cutter blade being provided in an introduction flow path that delivers the plasticized material to the nozzle opening;
a control unit configured to control the plasticizing unit, the discharging unit, and the fiber introducing unit to shape a three-dimensional shaped object including the covered fiber material; and
a discharge amount control mechanism configured to control a discharge amount of the plasticized material from the nozzle opening and simultaneously cutting the covered fiber material.

12. A method for manufacturing a three-dimensional shaped object, comprising:
a plasticizing step of plasticizing at least a part of a shaping material containing a thermoplastic resin to generate a plasticized material;
a fiber introducing step including at least one of a step of introducing a covered fiber material, which is a first fiber material covered with a covering material, into the plasticized material after being discharged from a nozzle opening, and a step of introducing the covered fiber material into the shaping material or the plasticized material before being discharged from the nozzle opening;
a cutting step of cutting the covered fiber material after the fiber introducing step, the cutting step including a step of cutting the covered fiber material by operating a discharge amount control mechanism, which is configured to control a discharge amount of the plasticized material from the nozzle opening, that is provided upstream of the nozzle opening to cut the covered fiber material disposed between the discharge amount control mechanism and a cutter blade provided in an introduction flow path that delivers the plasticized material to the nozzle opening; and
a shaping step of shaping a three-dimensional shaped object including the covered fiber material,
wherein the discharge amount control mechanism has a valve that rotates about an axis intersecting a direction in which the introduction flow path extends, and has a rod located downstream of the valve and arranged in a branch flow path connected to the introduction flow path, the branch flow path extending along a direction intersecting the direction in which the introduction flow path extends, and in the cutting step, the covered fiber material is sandwiched and cut between the rod and the cutter blade by moving the rod to protrude from the branch flow path into the introduction flow path.

13. The method for manufacturing a three-dimensional shaped object according to claim 12, wherein in the cutting step, after rotating the valve to stop discharging the plasticized material from the nozzle opening, moving the rod to protrude from the branch flow path into the introduction flow path so as to sandwich and cut the covered fiber material between the rod and the cutter blade, and then moving the rod into the branch flow path so as to suction the plasticized material in the introduction flow path into the branch flow path.

14. The method for manufacturing a three-dimensional shaped object according to claim 1, further comprising a selection step of selecting the first fiber material corresponding to a thickness of a shaping layer from a plurality of types of fiber materials having different fiber diameters, and in the shaping step, shaping the three-dimensional shaped object by laminating the shaping layer including the first fiber material selected in the selection step and the plasticized material.

15. The method for manufacturing a three-dimensional shaped object according to claim 1, wherein the shaping material contains a second fiber material having a fiber length shorter than that of the first fiber material.

16. The method for manufacturing a three-dimensional shaped object of claim 1, further comprising a discharge amount control step of controlling a discharge amount of the plasticized material and simultaneously cutting the covered fiber material.

* * * * *